US012795113B2

(12) United States Patent
Thiesse et al.

(10) Patent No.: US 12,795,113 B2
(45) Date of Patent: Nov. 10, 2026

(54) METHODS AND APPARATUS FOR DYNAMIC CODEC CONFIGURATION

(71) Applicant: GoPro, Inc., San Mateo, CA (US)

(72) Inventors: Jean-Marc Thiesse, Paris (FR); Maxime Bichon, Paris (FR); Fabien Dutuit, Paris (FR); Pradarshan Kini Gavali, Mountain View, CA (US); Martin Raoul, Paris (FR); Guillaume Brigot, Paris (FR); Pedro Machado Santos Rohde, Paris (FR)

(73) Assignee: GoPro, Inc., San Mateo, CA (US)

( * ) Notice: Subject to any disclaimer, the term of this patent is extended or adjusted under 35 U.S.C. 154(b) by 35 days.

(21) Appl. No.: 18/423,533

(22) Filed: Jan. 26, 2024

(65) Prior Publication Data

US 2025/0247546 A1 Jul. 31, 2025

(51) Int. Cl.
*H04N 19/154* (2014.01)
*H04N 19/136* (2014.01)
(Continued)

(52) U.S. Cl.
CPC ......... *H04N 19/154* (2014.11); *H04N 19/136* (2014.11); *H04N 19/146* (2014.11); *H04N 19/42* (2014.11)

(58) Field of Classification Search
CPC .. H04N 19/154; H04N 19/136; H04N 19/146; H04N 19/42
See application file for complete search history.

(56) References Cited

U.S. PATENT DOCUMENTS 5,649,032 A 7/1997 Burt
6,389,179 B1 5/2002 Katayama
(Continued)

FOREIGN PATENT DOCUMENTS

CN 101317461 12/2008
CN 104735464 A 6/2015
(Continued)

OTHER PUBLICATIONS

Bhat, Madhukar, Jean-Marc Thiesse, and Patrick Le Callet. "A case study of machine learning classifiers for real-time adaptive resolution prediction in video coding." 2020 IEEE International Conference on Multimedia and Expo (ICME). IEEE, 2020.
(Continued)

*Primary Examiner* — On S Mung
(74) *Attorney, Agent, or Firm* — Wang Hardoon, P.C.

(57) ABSTRACT

Systems, apparatus, and methods for dynamic encoder configuration. In one exemplary embodiment, a machine-learning model uses pixel features and encoding features from previous stages of an image processing pipeline (IPP) to dynamically adjust bitrate. The machine-learning model is trained to select bitrate adjustments for an encoder such that the expected image quality of a video stream remains at a selected quality level (e.g., SSIM, VMAF, VIF, HVS-PSNR, etc.). Conventional dynamic encoding solutions are focused on encode-once-deliver-often (best-effort) applications, the exemplary IPP is designed for real-time applications that may not have the benefit of actual subsequent encoding quality analysis; instead proxy data (pixel features and encoding features) that are representative approximations of image complexity are used.

19 Claims, 11 Drawing Sheets

(51) Int. Cl.
*H04N 19/146* (2014.01)
*H04N 19/42* (2014.01)

(56) References Cited

U.S. PATENT DOCUMENTS

| | | | |
|---|---|---|---|
| 8,135,068 | B1 | 3/2012 | Alvarez |
| 8,315,307 | B2 | 11/2012 | Chen |
| 8,606,073 | B2 | 12/2013 | Woodman |
| 8,665,942 | B2 | 3/2014 | Segall |
| 8,923,400 | B1 | 12/2014 | Alvarez |
| 9,088,798 | B2 | 7/2015 | Kato |
| 9,171,577 | B1 | 10/2015 | Newman |
| 9,277,122 | B1 | 3/2016 | Imura |
| 9,286,839 | B2 | 3/2016 | Okuda |
| 9,355,433 | B1 | 5/2016 | Adsumilli |
| 9,369,689 | B1 | 6/2016 | Tran |
| 9,478,054 | B1 | 10/2016 | Lewis |
| 9,575,803 | B2 | 2/2017 | Chauvet |
| 9,681,111 | B1 | 6/2017 | Newman |
| 9,681,140 | B2 | 6/2017 | Le Leannec |
| 9,774,855 | B2 | 9/2017 | Gao |
| 10,163,029 | B2 | 12/2018 | Doshi |
| 10,163,030 | B2 | 12/2018 | Doshi |
| 10,257,526 | B2 | 4/2019 | Luginbuhl |
| 10,269,326 | B2 | 4/2019 | Hasselgren |
| 10,509,982 | B2 | 12/2019 | Doshi |
| 11,902,580 | B2 | 2/2024 | Menon |
| 2001/0047517 | A1 | 11/2001 | Christopoulos |
| 2003/0007567 | A1 | 1/2003 | Newman |
| 2003/0035047 | A1 | 2/2003 | Katayama |
| 2003/0234866 | A1 | 12/2003 | Cutler |
| 2005/0226483 | A1 | 10/2005 | Geiger |
| 2005/0276501 | A1 | 12/2005 | Nakayama |
| 2006/0109900 | A1 | 5/2006 | Shen |
| 2006/0159352 | A1 | 7/2006 | Ishtiaq |
| 2006/0188014 | A1 | 8/2006 | Civanlar |
| 2006/0256397 | A1 | 11/2006 | Cui |
| 2006/0268131 | A1 | 11/2006 | Cutler |
| 2007/0064800 | A1 | 3/2007 | Ha |
| 2007/0237420 | A1 | 10/2007 | Steedly |
| 2008/0131014 | A1 | 6/2008 | Lee |
| 2008/0165105 | A1 | 7/2008 | Okuda |
| 2008/0187043 | A1 | 8/2008 | Ahn |
| 2008/0304567 | A1 | 12/2008 | Boyce |
| 2009/0180552 | A1 | 7/2009 | Visharam |
| 2010/0014780 | A1 | 1/2010 | Kalayeh |
| 2010/0054628 | A1 | 3/2010 | Levy |
| 2010/0158134 | A1 | 6/2010 | Yin |
| 2010/0246691 | A1 | 9/2010 | Filippini |
| 2011/0135198 | A1 | 6/2011 | Schuler |
| 2011/0211081 | A1 | 9/2011 | Tsubaki |
| 2012/0092453 | A1 | 4/2012 | Sun |
| 2012/0242788 | A1 | 9/2012 | Chuang |
| 2012/0307000 | A1 | 12/2012 | Doepke |
| 2013/0002907 | A1 | 1/2013 | Alvarez |
| 2013/0021483 | A1 | 1/2013 | Bennett |
| 2014/0036998 | A1 | 2/2014 | Matthias |
| 2014/0105278 | A1 | 4/2014 | Bivolarsky |
| 2014/0152863 | A1 | 6/2014 | Drouot |
| 2014/0218354 | A1 | 8/2014 | Park |
| 2014/0258552 | A1 | 9/2014 | Oyman |
| 2015/0023433 | A1 | 1/2015 | Ninan |
| 2015/0043655 | A1 | 2/2015 | Nilsson |
| 2015/0049956 | A1 | 2/2015 | Kato |
| 2015/0063449 | A1 | 3/2015 | Pearson |
| 2015/0065803 | A1 | 3/2015 | Douglas |
| 2015/0109468 | A1 | 4/2015 | Laroia |
| 2015/0124877 | A1 | 5/2015 | Choi |
| 2015/0138311 | A1 | 5/2015 | Towndrow |
| 2015/0249813 | A1 | 9/2015 | Cole |
| 2015/0296208 | A1 | 10/2015 | Gao |
| 2015/0296231 | A1 | 10/2015 | Kwon |
| 2015/0341552 | A1 | 11/2015 | Chen |
| 2015/0341557 | A1 | 11/2015 | Couture |
| 2015/0346832 | A1 | 12/2015 | Cole |
| 2015/0365688 | A1 | 12/2015 | Su |
| 2016/0012855 | A1 | 1/2016 | Krishnan |
| 2016/0014422 | A1 | 1/2016 | Su |
| 2016/0050423 | A1 | 2/2016 | Alshina |
| 2016/0065947 | A1 | 3/2016 | Cole |
| 2016/0073111 | A1 | 3/2016 | Lee |
| 2016/0142697 | A1 | 5/2016 | Budagavi |
| 2016/0173884 | A1 | 6/2016 | Le Leannec |
| 2016/0241892 | A1 | 8/2016 | Cole |
| 2016/0253795 | A1 | 9/2016 | Cole |
| 2016/0274338 | A1 | 9/2016 | Davies |
| 2016/0295128 | A1 | 10/2016 | Schnittman |
| 2016/0323556 | A1 | 11/2016 | Luginbuhl |
| 2016/0366422 | A1 | 12/2016 | Yin |
| 2017/0178594 | A1 | 6/2017 | Hasselgren |
| 2017/0339389 | A1 | 11/2017 | Doshi |
| 2017/0339390 | A1 | 11/2017 | Doshi |
| 2018/0176573 | A1 | 6/2018 | Chawla |
| 2019/0197341 | A1 | 6/2019 | Doshi |
| 2023/0179800 | A1 * | 6/2023 | Menon .................. H04N 19/30 375/240.12 |
| 2024/0121400 | A1 * | 4/2024 | Menon ................ H04N 19/115 |
| 2025/0008227 | A1 | 1/2025 | Vacquerie |

FOREIGN PATENT DOCUMENTS

| | | | |
|---|---|---|---|
| CN | 110996131 | | 4/2020 |
| EP | 1162830 | A2 | 12/2001 |
| WO | 2013130071 | A1 | 9/2013 |

OTHER PUBLICATIONS

ITU-T P.910, Subjective Video Quality Assessment Methods for Multimedia Applications, Recommendation, International Telecommunication Union, 2022.
Katsenou, Angeliki V., et al. "Predicting video rate-distortion curves using textural features." 2016 Picture Coding Symposium (PCS). IEEE, 2016.
Katsenou, Angeliki V., Joel Sole, and David R. Bull. "Content-gnostic bitrate ladder prediction for adaptive video streaming." 2019 Picture Coding Symposium (PCS). IEEE, 2019.
Kazantsev, Roman, Sergey Zvezdakov, and Dmitriy S. Vatolin. "Machine-Learning-Based Method for Finding Optimal Video-Codec Configurations Using Physical Input-Video Features." DCC. 2020.
Menon, Vignesh V., et al. "Content-adaptive Encoder Preset Prediction for Adaptive Live Streaming." 2022 Picture Coding Symposium (PCS). IEEE, 2022.
Menon, Vignesh V., et al. "JND-aware Two-pass Per-title Encoding Scheme for Adaptive Live Streaming." IEEE Transactions on Circuits and Systems for Video Technology (2023).
Menon, Vignesh V., et al. "Opte: Online per-title encoding for live video streaming." ICASSP 2022-2022 IEEE International Conference on Acoustics, Speech and Signal Processing (ICASSP). IEEE, 2022.
Menon, Vignesh V., et al. "VCA: Video complexity analyzer." Proceedings of the 13th ACM multimedia systems conference. 2022.
NV_ENC_CONFIG Struct Reference, https://ffmpeg.org/doxygen/3.3/structNV_ENC_CONFIG.html.
NV_ENC_PIC_PARAMS Struct Reference, https://ffmpeg.org/doxygen/3.3/structNV_ENC_PIC_PARAMS.html.
NvEncodeAPI Data Structures, https://ffmpeg.org/doxygen/3.3/group_ENCODER_STRUCTURE.html.
PCT Written Opinion issued in App. No. PCT/US2023/062157, 6 pages.
Per-Title Encode Optimization, Netflix Technology Blog, Dec. 14, 2015, https://netflixtechblog.com/per-title-encode-optimization-7e99442b62a2.
H.264/MPEG-4 AVC video coding standard (Advanced Video Coding for Generic Audiovisual Services, published Aug. 2021, 844 pages.
Achanta R., et al., Slic Superpixels Gompared to State-of-The-Art Superpixei Methods, $q# IEEE Transactions on Pattern Analysis and Machine intelligence, 2012, vol. 34 (11), pp. 2274-2282.

(56) References Cited

OTHER PUBLICATIONS

Allene C, et al,, 'Seamless Image-based Texture Atlases Using Multi-band Blending,' Pattern Recognition, 2008. ICPR 2008. 19th International Conference on, 2008. 4 pages.
Badrinarayanan V., et al., 'Segnet: a Deep Convoiutional Encoder-Decoder Architecture for Image Segmentation,' arXiv preprint arXiv: 1511.00561, 2015. 14 pages.
Barghout L. and Sheynin J., 'Real-world scene perception and perceptual organization: Lessons from Computer Vision'. Journal of Vision, 2013, vol. 13 (9). (Abstract). 1 page.
Barghout L., Visual Taxometric approach Image Segmentation using Fuzzy-Spatial Taxon Cut Yields Contextually Relevant Regions, Communications in Computer and Information Science (CCIS), Springer-Verlag, 2014, pp. 163-173.
Bay H., et al., 'Surf: Speeded up Robust Features,' European Conference on Computer Vision, Springer Berlin Heidelberg, 2006, pp. 404-417.
Beier et al., Feature-Based Image Metamorphosis, $q# in Computer Graphics Journal, Jul. 1992, vol. 28 (2), pp. 35-42.
Brainard R.C., et al., "Low-Resolution TV: Subjective Effects of Frame Repetition and Picture Replenishment," Bell Labs Technical Journal, Jan. 1967, vol. 46 (1), pp. 261-271.
Burt et al., A Multiresolution Spline with Application to Image Mosaics, in ACM Transactions on Graphics (TOG), 1983, vol. 2, No. 4, pp. 217-236.
Chan et al., Active contours without edges. IEEE Transactions on Image Processing, 2001, 10 (2), pp. 266-277 (hereinafter Chan).
Chang H., et al., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.
Elen, 'Whatever happened to Ambisonics' AudioMedia Magazine, Nov. 1991. 18 pages.
Gracias, et al., Fast Image Blending Using Watersheds and Graph Cuts, Image and Vision Computing, 2009, vol. 27 (5), pp. 597-607.
Grois D., et al., Complexity-Aware Adaptive Spatial Pre-Processing for ROI Scalable Video Coding With Dynamic Transition Region, Image Processing (ICIP), 2011 18TH IEEE International Conference On, IEEE, Sep. 11, 2011, pp. 741-744, XP032080597, DOI: 10.1109/ICIP.2011.6116661, Isbn: 978-1-4577-1304-0.
Grois, et al., 'Recent Advances in Region-of-Interest Video Coding' In: 'Recent Advances on Video Coding', Jul. 5, 2011 (Jul. 5, 2011), InTech, XP055257835, Isbn: 978-953-30-7181-7 DOI: 10.5772/17789, 29 pages.
Grois, et al., "Efficient Adaptive Bit-Rate Control for ROI Scalable Video Coding", Workshop on Picture Coding and Image Processing 2010; Dec. 7, 2010-Dec. 7, 2010; NAGOYA, Dec. 7, 2010 (Dec. 7, 2010), XP030082089, 2 pages.
H.264 (Oct. 2012) and/or ISO/IEC 14496-10:2012, Information technology—Coding of audio-visual objects—Part 10: Advanced Video Coding, 402 pages.
Herbst E., et al., 'Occlusion Reasoning for Temporal Interpolation Using Optical Flow,' Department of Computer Science and Engineering, University of Washington, Tech. Rep. UW-CSE-09-08-01. 41 pages.
High Efficiency Video Coding (HEVC), also known as H.265 (described in e.g., ITU-T Study Group 16—Video Coding Experts Group (VCEG)-ITU-T H.265, and/or ISO/IEC JTC 1/SC 29/WG 11 Motion Picture Experts Group (MPEG)—the HEVC standard ISO/IEC 23008-2:2015, 657 pages.
Ichimura D., et al., 'Slice Group Map for Mult. Interactive ROI Seal', 17. JVT Meeting; 74. Mpeg Meeting; Oct. 14, 2005-Oct. 21, 2005; Nice, FR;(Joint Video Team of ISO/IEC JTC1/SC29/WG11 and ITU-T SG.16), No. JVT-Q020r1, Oct. 14, 2005 (Oct. 14, 2005), XP030006183, ISSN: 0000-0413. 20 pages.
Jakubowski M., et al., 'Block-based motion estimation algorithmsa survey,' Opto-Eiectronics Review 21, No. 1 (2013), pp. 88-102.
Kendall A., et al., 'Bayesian Segnet: Model Uncertainty in Deep Convolutional Encoder-Decoder Architectures for Scene Understanding,' arXiv: 1511.02680, 2015. (11 pages).
Lowe, David G. "Object recognition from local scale-invariant features." In Computer vision, 1999. The proceedings of the seventh IEEE international conference on, vol. 2, pp. 1150-1157. IEEE 1999. (Year: 1999).
Mitzel D., et al., Video Super Resolution Using Duality Based TV-11 Optical Flow, $q# Joint Pattern Recognition Symposium, 2009, pp. 432-441.
Perez et al., 'Poisson Image Editing,' in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schwartz, E., et al., "Implementation of Compression with Reversible Embedded Wavelets," In Proc. SPIE, 1995, 12 pages.
Suzuki et al., Inter Frame Coding with Template Matching Averaging, $q# in IEEE international Conference on Image Processing Proceedings (2007), Vol (iII), pp. 409-412.
Szeliski R., "Computer Vision: Algorithms and Applications," Springer Science & Business Media, 2010, 979 pages.
Thaipanich T., et al., "Low Complexity Algorithms for Robust Video frame rate up-conversion (FRUC) technique," IEEE Transactions on Consumer Electronics, Feb. 2009, vol. 55 (1), pp. 220-228.
Ugur et al.,"MV-HEVC/SHVC HLS: On default Output Layer Sets", Jan. 2014. 4 pages.
Vass, J., et al., Efficient Three-Dimensional Wavelet Codecs for Networked Video Communication, in Proceedings of IEEE International Conference on Image Processing, Kobe, Japan, Oct. 1999, pp. 565-569.
Won, et al., Size-Controllable Region-of-Interest in Scalable Image Representation, IEEE Transactions on Image Processing, IEEE Service Center, Piscataway, NJ, US, vol. 20, No. 5, May 1, 2011 (May 1, 2011), pp. 1273-1280, XPO 11411787, ISSN: 1057-7149, DOI: 10.1109/TIP.2010.2090534.
Xiao, et al., Multiple View Semantic Segmentation for Street View Images, 2009 IEEE 12th International Conference on Computer Vision, 2009, pp. 686-693.
Xiong Y et al., 'Gradient Domain Image Blending and Implementation on Mobile Devices,' International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.

* cited by examiner

METHODS AND APPARATUS FOR DYNAMIC CODEC CONFIGURATION

RELATED APPLICATIONS

This application is related to PCT Application Serial No. PCT/US23/62157, filed Feb. 7, 2023, and entitled "Methods and Apparatus for Real-Time Guided Encoding", incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to encoding video content. Specifically, the present disclosure relates to dynamically configuring the codec according to a desired image quality.

DESCRIPTION OF RELATED TECHNOLOGY

Existing video encoding techniques utilize so-called intra-frames (I-frames), predicted frames (P-frames), and bi-directional frames (B-frames). The 3 different frame types may be used in specific situations to improve video compression efficiency. Most codecs encode video based on image analysis and metrics. Image analysis is computationally complex and often requires look-forward/look-backward comparisons between frames.

An embedded device is a computing device that contains a special-purpose compute system. In many cases, embedded devices must operate within aggressive processing and/or memory constraints to ensure that real-time budgets are met. For example, an action camera (such as the GoPro HERO™ families of devices) must capture each frame of video at the specific rate of capture (e.g., 30 frames per second (fps)). As a practical matter, video compression quality may be significantly limited in embedded devices.

DETAILED DESCRIPTION

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Image Processing Pipeline

Figure 1:
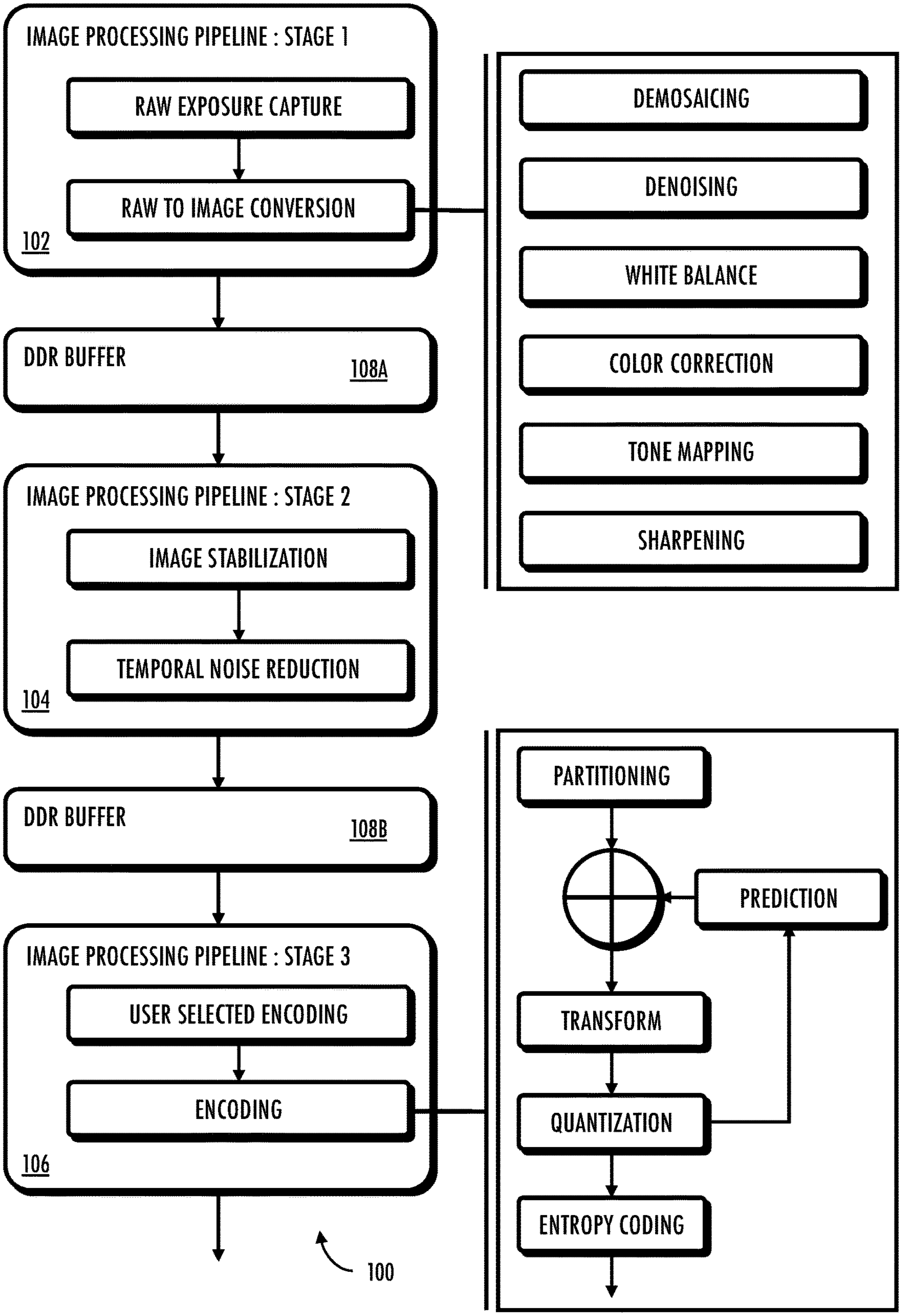
FIG. 1 depicts a logical flow diagram of the exemplary image processing pipeline (IPP), useful for explaining various aspects of the present disclosure.

FIG. 1 is a logical flow diagram of the exemplary image processing pipeline (IPP) 100, useful to illustrate various aspects of the present disclosure. As shown, the exemplary IPP has three (3) stages: a first stage 102 that captures raw data and converts the raw data to a color space (e.g., YUV), a second stage 104 that performs in-camera pre-processing, and a third stage 106 for encoding video. Transitions between stages of the pipeline are facilitated by DDR buffers 108A, 108B.

As a brief aside, the first stage 102 converts "raw" light information that was captured by a sensor, into "pixel" data that is suitable for display and/or post-capture image manipulations (post-processing). Typically, ISP operations include demosaicing, white balance, denoising, color cororection, tone mapping, sharpening, etc. While the following discussion is presented with a specific set of operations and ordering, other operations and/or orders may be substituted with equal success.

In one exemplary embodiment, the first stage 102 is implemented within an image signal processor (ISP). As shown, the ISP controls the light capture of a camera sensor and may also perform color space conversion. The camera captures light information by "exposing" its photoelectric sensors for a short period of time. The "exposure" may be characterized by three parameters: aperture, ISO (sensor gain) and shutter speed (exposure time). Exposure determines how light or dark an image will appear when it's been captured by the camera. During normal operation, a digital camera may automatically adjust aperture, ISO, and shutter speed to control the amount of light that is received; this functionality is commonly referred to as "auto exposure". Most action cameras are fixed aperture cameras due to form factor limitations and their most common use cases (varied lighting conditions)—fixed aperture cameras only adjust ISO and shutter speed.

After each exposure, the ISP reads raw luminance data from the photoelectric camera sensor; the luminance data is associated with locations of a color filter array (CFA) to create a "mosaic" of chrominance values. The ISP demosaics the luminance and chrominance data to generate a standard color space for the image; for example, in the illustrated embodiment, the raw data is converted to the YUV (or YCrCb) color space.

The ISP performs white balance and color correction to compensate for lighting differences. White balance attempts to mimic the human perception of "white" under different light conditions. As a brief aside, a camera captures chrominance information differently than the eye does. The human visual system perceives light with three different types of "cone" cells with peaks of spectral sensitivity at short ("blue", 420 nm-440 nm), middle ("green", 530 nm-540 nm), and long ("red", 560 nm-580 nm) wavelengths. Human sensitivity to red, blue, and green change over different lighting conditions; in low light conditions, the human eye has reduced sensitivity to red light but retains blue/green sensitivity, in bright conditions, the human eye has full color vision. Without proper white balance, environmental color temperatures will look unnatural. For instance, an image shot in a fluorescent room will look "greenish", indoor tungsten light will look "yellowish", and shadows may be "bluish". White balance can correct the "white point", however additional color correction may be necessary to balance the rest of the color spectrum. Color correction may mimic natural lighting, or add artistic effects (e.g., to make blues and oranges "pop", etc.).

After color space conversion, the output images of the first stage 102 of the IPP may be written to the DDR buffer 108A. In one specific implementation, the DDR buffer 108A may be a first-in-first-out (FIFO) buffer of sufficient size for the maximum IPP throughput; e.g., a 5.3K (15.8 MegaPixels) of 10-bit image data at 60 frames per second (fps) with a 1 second buffer would need ~10 Gbit (or 1.2 GByte) of working memory. In some cases, the memory buffer may be allocated from a system memory; for example, a 10 Gbit region from a 32 Gbit DRAM may be used to provide the DDR buffer 108A. In the illustrated embodiment, the memory buffers can be accessed with double-data rate (DDR) for peak data rates, but should use single data rate (SDR), when possible, to minimize power consumption and improve battery life. While the illustrated embodiment depicts two memory buffers for clarity, any number of physical memory buffers may be virtually subdivided or combined for use with equal success.

In one exemplary embodiment, auto exposure and color space conversion statistics may be written as metadata associated with the output images. As but one such example, auto exposure settings (ISO, and shutter speed) for each image may be stored within a metadata track. Similarly, white balance and color correction adjustments may be stored within the metadata track. In some cases, additional statistics may be provided—for example, color correction may indicate "signature" spectrums (e.g., flesh tones for face detection, spectral distributions associated with common sceneries (foliage, snow, water, cement), and/or specific regions of interest. In fact, some ISPs explicitly provide e.g., facial detection, scene classification, and/or region-of-interest (ROI) detection.

Artisans of ordinary skill in the related art will readily appreciate that the first stage 102 of the IPP may include other functionality, the foregoing being purely illustrative. As but one example, some ISPs may additionally spatially denoise each image before writing to DDR buffer 108A. As used herein, "spatial denoising" refers to noise reduction techniques that are applied to regions of an image. Spatial denoising generally corrects chrominance noise (color fluctuations) and luminance noise (light/dark fluctuations). Other examples of ISP functionality may include, without limitation, autofocus, image sharpening, contrast enhancement, tone mapping, and any other sensor management/image enhancement techniques.

Referring back to FIG. 1, the second stage 104 is implemented within a central processing unit (CPU) and/or graphics processing unit (GPU). The second stage 104 retrieves groups of images from the DDR buffer 108A and incorporates sensor data to perform image stabilization and other temporal denoising. As used herein, "temporal denoising" refers to noise reduction techniques that are applied to across multiple images.

As a brief aside, action photography is captured under difficult conditions which are often out of the photographer's control. For example, action cameras are often used while in-motion. As a result, the relative motion between the camera's motion and the subject motion can create the perception of apparent motion when the footage is subsequently viewed in a stable frame-of-reference. In-device image stabilization may have significant benefits for downstream processing; for example, video codecs compress similar frames of video using motion estimation between frames, stabilized video results in much better compression (e.g., smaller file sizes, less quantization error, etc.)

A variety of different stabilization techniques exist to remove undesirable camera motion. For example, so-called electronic image stabilization (EIS) relies on image manipulation techniques to compensate for camera motion. As used herein, a "captured view" refers to the total image data that is available for electronic image stabilization (EIS) manipulation. A "designated view" of an image is the visual portion of the image that may be presented on a display and/or used to generate frames of video content. EIS algorithms generate a designated view to create the illusion of stability; the designated view corresponds to a "stabilized" portion of the captured view. In some cases, the designated view may also be referred to as a "cut-out" of the image, a "cropped portion" of the image, or a "punch-out" of the image.

Images captured with sensors that use an Electronic Rolling Shutter (ERS) can also introduce undesirable rolling shutter artifacts where there is significant movement in either the camera or the subject. ERS exposes rows of pixels to light at slightly different times during the image capture. As a brief aside, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time but they are not erased/read at the same time since the pointers scan through the rows. This slight temporal shift between the start of each row may result in a deformed image if the image capture device (or subject) moves.

ERS compensation may be performed to correct for rolling shutter artifacts from camera motion. In one specific implementation, the capture device determines the changes in orientation of the sensor at the pixel acquisition time to correct the input image deformities associated with the motion of the image capture device. Specifically, the changes in orientation between different captured pixels can be compensated by warping, shifting, shrinking, stretching, etc. the captured pixels to compensate for the camera's motion.

In some cases, temporal noise reduction may be used to further enhance the overall quality of the video content by reducing the visual artifacts or distortions caused by temporal variations. This can include random noise, flickering, or other irregularities that may be present in consecutive frames of a video or images. Temporal denoising techniques smooth differences in pixel movements between successive images. This technique may be parameterized according to a temporal filter radius and a temporal filter threshold. The temporal filter radius determines the number of consecutive frames used for temporal filtration. Higher values of this setting lead to more aggressive (and slower) temporal filtration, whereas lower values lead to less aggressive (and faster) filtration. The temporal filter threshold setting determines how sensitive the filter is to pixel changes in consecutive frames. Higher values of this setting lead to more aggressive filtration with less attention to temporal changes (lower motion sensitivity). Lower values lead to less aggressive filtration with more attention to temporal changes and better preservation of moving details (higher motion sensitivity). Temporal denoising may include calculations of pixel motion vectors between images for smoothing; these calculations are similar in effect to the motion vector calculations performed by the codec and may predict subsequent codec workload.

Referring back to FIG. 1, the image processing pipeline includes a third stage 106. The third stage 106 encodes a sequence of images into video formats for transmission, storage, and/or rendering. Complementary decoding operations can be used to decode the sequence of images from the video formats. Depending on the encoding techniques, the encoding may be lossy or lossless (the decoded images may, or may not, be exact reproductions of the original input images).

In one exemplary embodiment, the encoder is implemented within a codec that is configured via application programming interface (API) calls from the CPU. Codec operation may be succinctly condensed into the following steps: opening an encoding session, determining encoder attributes, determining an encoding configuration, initializing the hardware pipeline, allocating input/output (I/O) resources, encoding one or more frames of video, writing the output bitstream, and closing the encoding session. In slightly more detail, an encoding session is "opened" via an API call to the codec (physical hardware or virtualized software). The API allows the codec to determine its attributes (e.g., encoder globally unique identifier (GUID), profile GUID, and hardware supported capabilities) and its encoding configuration. In some implementations, the encoding configuration is based on real-time guidance (e.g., quantization, compression, bit rate adjustment, and/or group of picture (GOP) sizing may be based on parameters provided from upstream IPP operations). Thereafter, the codec can initialize its parameters based on its attributes and encoding configuration and allocate the appropriate I/O resources—at this point, the codec is ready to encode data. Subsequent codec operation retrieves input frames, encodes the frames into an output bitstream, and writes the output bitstream to a data structure for storage/transfer. After the encoding has terminated, the encoding session can be "closed" to return codec resources back to the system.

In some embodiments, real-time guidance can update and/or correct the encoding configuration during and (in some variants) throughout a live capture. Specifically, the third stage 106 of the IPP can use capture and conversion statistics (from the first stage 102) and sensed motion data (from the second stage 104) to configure the encoding parameters prior to processing. For instance, the CPU may determine quantization parameters based on auto exposure and color space conversion statistics for the output images discussed above. In some cases, quantization parameters may be based on pixel motion vectors obtained from the temporal denoising discussed above. Where available, facial recognition, scene classification, and/or region-of-interest (ROI) metadata may also be used. Additionally, flagged images and/or orientation information may be used to determine GOP sizing. Similar adjustments may be made to compression and bit rate adjustments. Advantageously, the real-time guidance information from previous stages may be retrieved in advance of encoding—this is a function of the IPP's pipelining. More directly, instead of buffering 1 second of images within the codec so that the codec can perform look-forward/look-behind prediction, the CPU can configure the codec's encoding parameters based on 1 second of real-time guidance provided by earlier stages of the IPP.

A comprehensive listing of various encoding parameters and API calls may be found at the following links (last retrieved Feb. 3, 2022), incorporated herein by reference in their entireties:

https://ffmpeg.org/doxygen/3.3/group_ENCODER_STRUCTURE.html;

https://ffmpeg.org/doxygen/3.3/structNV_ENC_PIC_PARAMS.html; and https://ffmpeg.org/doxygen/3.3/structNV_ENC_CONFIG.html.

During encoding operation, the codec: partitions, predicts, transforms, quantizes, and entropy encodes, according to the aforementioned encoding parameters. While the following discussion is presented with a specific set of operations and ordering, other operations and/or orders may be substituted with equal success.

Partitioning temporally divides the input images into temporal blocks that are called groups of pictures (GOPs). Each GOP contains several frames. Depending on the parameterization of the encoder, each frame may be assigned a frame type: intra-coded (I) frames, predicted (P) frames, bidirectional predicted (B) frames. The GOP structure defines how the frame types are distributed; each GOP starts with an I-frame followed by several P-frames and/or B-frames. Each frame may be further spatially divided into blocks, and in some cases, sub-blocks.

Prediction is performed based on frame type. Intra-prediction uses only blocks from the same frame, inter-prediction uses blocks from other frames. I-frames only use intra-prediction. P-frames may only use inter-prediction from previous frames; B-frames may use inter-prediction from both previous frames and future frames. P-frames and B-frames may also use intra-prediction.

Typically, intra-prediction occurs in raster-scan ordering (e.g., right-to-left, top-to-bottom); a block is predicted based on the horizontal line of pixels immediately above it or the vertical line immediately to its left. The encoder chooses the best option from a list of possible predictions, such as taking the average of these pixels, or copying the line above it horizontally, or the line to the left vertically, etc. In contrast, inter-prediction uses motion estimation (ME) between two frames (e.g., previous and current, current and future, etc.) to estimate a motion vector (MV) for motion-compensated prediction MCP). The MV may be coarsely approximated initially, and then further refined with a localized search.

Prediction is seldom perfect, thus, the error between the predictions and the actual pixel values is commonly referred to as the "residual". Different prediction modes may be selected based on the amount of residual and the motion vectors between frames. Under an "inter" mode, the pixel residual and MV approximation refinements are transmitted. Inter mode is efficient when there is overall movement in many directions everywhere (e.g., no common motion vector). "Merge" mode transmits the pixel residual and only the coarse MV approximations (no refinements); merge mode is efficient when there is stable and constant movement across frames. "Skip" mode does not transmit residuals or MV approximations; skip mode is efficient where there is very little motion between frames.

Ideally, the prediction residual is expected to contain mostly zeros and low values. The transform step converts the prediction residual to the frequency domain, which groups low spatial frequency information within only a few coefficients. In most video coding implementations, the transform is applied to the residual of a prediction instead of the image values themselves (image coding transforms usually are applied to the image values). The most common transforms are the Discrete Cosine Transform (DCT) and the Discrete Sine Transform (DST); some encoders may actively select between different transforms.

The foregoing steps may be implemented losslessly, however in some cases, some amount of lossy-ness is tolerable. In such implementations, the quantization step can be used to quantize the residuals, etc. to reduce data size. The quantization parameter (QP) is used to affect the amount of quantization; larger QP results in higher quantization and lossiness, lower QP results in lower quantization and preserves more fidelity. The QP is a key parameter of encoder operation and strongly influences the encoded image quality and size.

Entropy coding translates the encoder's data and quantized transformed residuals into a bitstream that is packaged into a container file. In some cases, entropy coding may additionally incorporate lossless encodings to improve compression.

Additional discussion about image processing pipelines, various modifications and improvements may be found in PCT Application Serial No. PCT/US23/62157, filed Feb. 7, 2023, and entitled "Methods and Apparatus for Real-Time Guided Encoding", incorporated herein by reference in its entirety.

Conventional Dynamic Encoding Techniques

Dynamic encoding techniques seek to optimize the encoding process for an optimization target. Optimization techniques generally seek to balance multiple constraints; for example, a dynamic encoding technique might attempt to trade-off between bitrate, quality, and computational complexity, etc.

Figure 2:
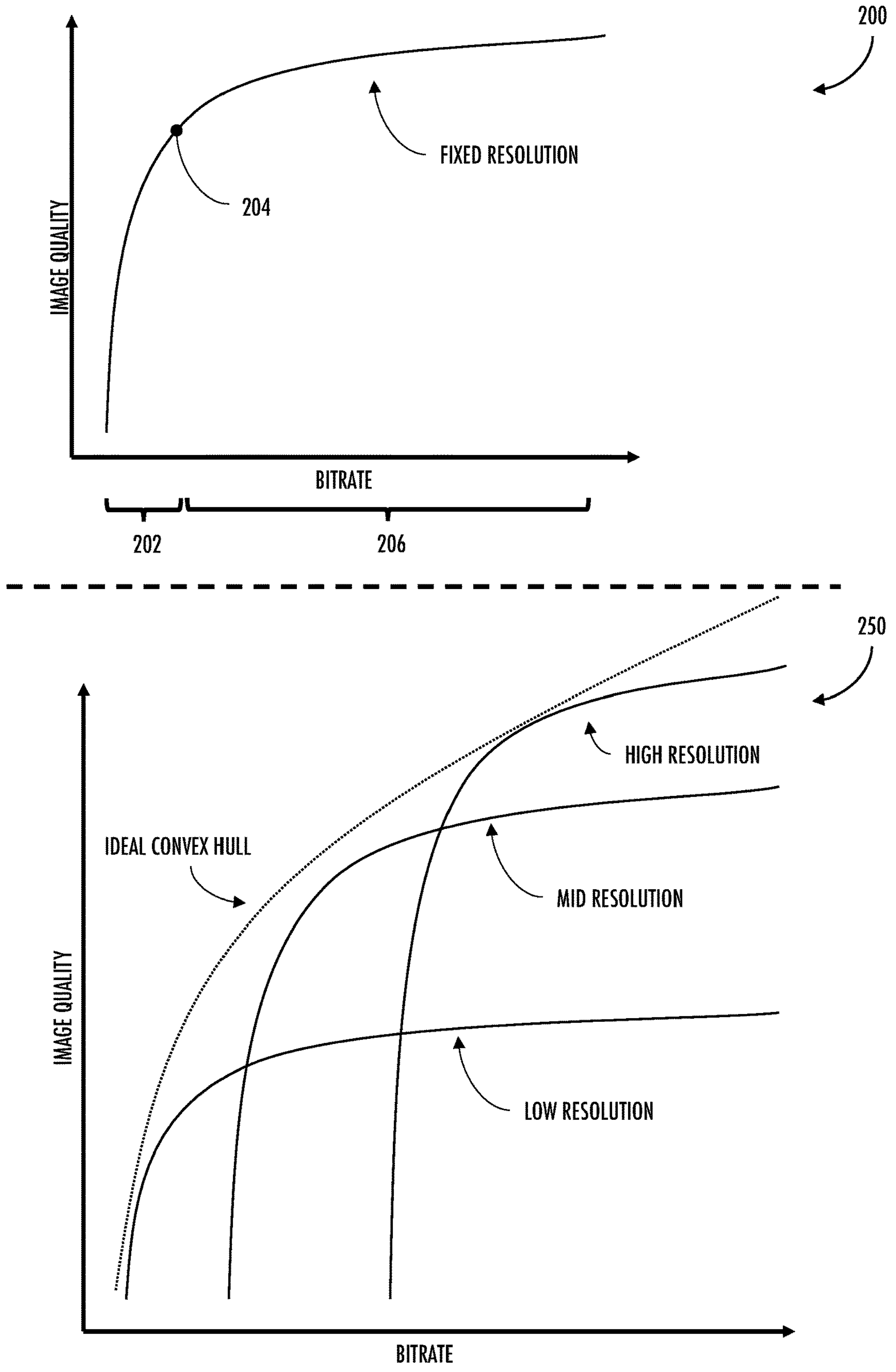
FIG. 2 depicts a graphical representation of image quality as a function of bitrate for encoding an image of fixed resolution and an ideal convex hull, useful for explaining various aspects of the present disclosure.

Most trade-offs have some form of diminishing return. For example, a first bitrate-quality curve 200 of FIG. 2 illustrates how image quality varies as a function of bitrate for encoding an image of fixed resolution. The bitrate-quality curve 200 is characterized by a region of steep ascent 202, a kink 204, and a plateau region 206. As shown, larger increases in bitrate are needed to achieve smaller increases in image quality in the plateau region 206.

FIG. 2 also compares multiple bitrate-quality curves 250 for different resolutions (scaled for comparison). At lower bitrates, low resolution encodings have an edge since fewer pixels are encoded. As the bitrate increases, however, the low resolution curve quickly reaches a natural limit of fidelity. Higher resolutions are harder to encode at low bitrates, but the number of bits eventually becomes enough to encode higher quantities of pixels resulting in a higher image quality (when compared to upscaled lower resolutions).

The observed relationship between bitrates, image quality, and resolution has been experimentally explored by others. For example, Per-title Encode Optimization published Dec. 14, 2015 by Aaron et al. at https://netflixtechblog.com/per-title-encode-optimization-7e99442b62a2, last retrieved Dec. 29, 2023 (hereinafter "Aaron"), incorporated herein by reference in its entirety, observes that "each resolution has a bitrate region in which it outperforms other resolutions". Combining these points describes a "convex hull" that identifies the point of diminishing returns (kink) for all bitrate-resolution combinations. Aaron uses the convex hull to search for practical bitrate-resolution pairs that provides acceptable performance. Aaron is representative of most conventional dynamic encoding works. Table 1 provides a brief summary of other notable works in this area.

TABLE 1

Notable Dynamic Encoding Implementations

| Notable Implem.: | Application: | Optimization Target: | Technique: |
|---|---|---|---|
| Netflix (Aaron et al.) | VOD | Bitrate-Resolution Pairs | Exhaustive Search |
| Athena Lab | Live, VOD | Bitrate-Resolution Pairs | ML Prediction |
| INSA Rennes | Live, VOD | Bitrate-Resolution Pairs | ML Prediction |
| Bhat et al. | Live | Resolution | ML Prediction |

Most research into encoding techniques have been focused on dynamically encoding video for bandwidth and/or playback considerations. For example, VOD services are often limited to a few commonly supported resolutions (1080p, 4K, etc.) and must fit their services within available network capacity (bitrates). Live streaming is similarly constrained. Practical solutions for these applications generally focus on fixed "ladders" of bitrate-resolution pairs. Table 2 provides an example of a bitrate-resolution ladder described by Aaron.

TABLE 2

| Notable Dynamic Encoding Implementations | |
|---|---|
| Bitrate (kbps) | Resolution |
| 235 | 320 × 240 |
| 375 | 384 × 288 |
| 560 | 512 × 384 |
| 750 | 512 × 384 |
| 1050 | 640 × 480 |
| 1750 | 720 × 480 |
| 2350 | 1280 × 720 |
| 3000 | 1270 × 720 |
| 4300 | 1920 × 1080 |
| 5800 | 1920 × 1080 |

Figure 3:
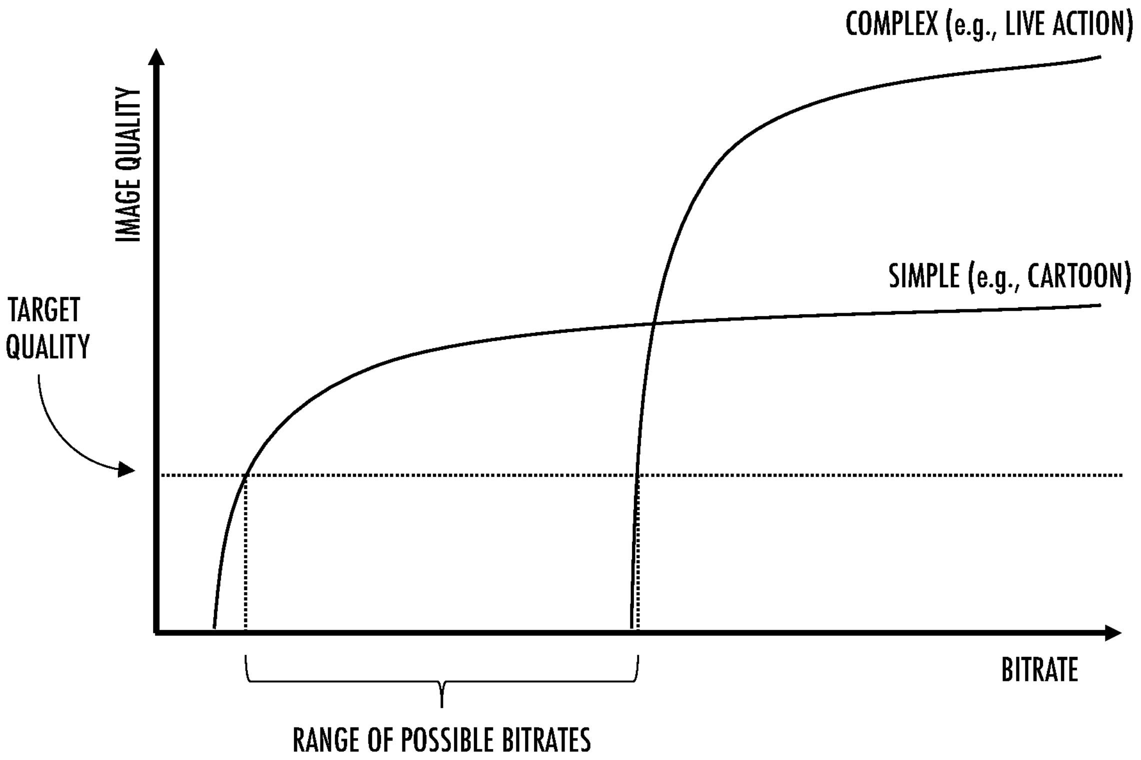
FIG. 3 depicts a graphical representation of the range of possible bitrates for a target quality, useful for explaining various aspects of the present disclosure.

Importantly, these ladders are applied to all videos, regardless of their content. Although they are chosen to produce good encodings for most generic content, they are not individually selected for specific content (titles). An interesting example is live-action content versus animation content. Due to the simple nature of cartoons, sufficient quality can be achieved at lower bitrates, even for high resolutions. On the other hand, complex textures and movement in live-action demand more bits in their encodings. This effect is illustrated in FIG. 3. with the rate-quality curves of videos of different complexity but encoded with the same encoder configuration. Conceptually, this is because the actual resolution of the physical display ("display resolution") is different than the resolution required to render perceptually acceptable content. VOD and live streaming applications take the practical approach of addressing known constraints (e.g., available network bandwidth and display resolution), which is easier task than trying to ascertain what might be "perceptually acceptable" for each title.

GoPro, Inc. is a camera manufacturer that specializes in action camera photography. Action cameras have unique application requirements that are different than other cameras and/or media services. Unlike VOD and live streaming services which provide ready-to-view content, action cameras record video which is often post-processed. Since post-processing can only edit the captured signal and noise (i.e., signal cannot be later recovered from noise), action cameras often record videos at the highest available quality.

GoPro's current camera model (HERO11) encodes video with HEVC in a single-pass constant bitrate (CBR) mode. The GOP duration is fixed (one second) corresponding to the hardware capabilities of the image processing pipeline; for similar reasons, the GOP structure is limited to one I-frame followed by a number of P-frames. Currently, the user can start recording in only one of two encoding modes: standard and high. These bitrate values are chosen to produce subjectively good image quality encodings for average video content. In other words, the encoded video's bitrate is independent of the content complexity, which means that complex scenes may have insufficient image quality, while simple scenes may be wasting data. Table 3 provides frame rates and resolutions for the standard bitrate mode of a current model camera (HERO11), Table 4 provides frame rates and resolutions for the high bitrate mode of the current model camera.

TABLE 3

| Standard Bitrate Mode | | | | | |
|---|---|---|---|---|---|
| Resolution, FPS | 240 200 | 120 100 | 60 50 | 30 25 | 24 |
| 5.3K | N/A | N/A | 60 | 60 | 60 |
| 4K | N/A | 60 | 60 | 45 | 45 |
| 2.7K | 60 | 60 | 45 | N/A | N/A |
| 1080p | 60 | 45 | 45 | 45 | 45 |

TABLE 4

| High Bitrate Mode | | | | | |
|---|---|---|---|---|---|
| Resolution, FPS | 240 200 | 120 100 | 60 50 | 30 25 | 24 |
| 5.3K | N/A | N/A | 120 | 100 | 100 |
| 4K | N/A | 120 | 100 | 100 | 100 |
| 2.7K | 100 | 100 | 100 | N/A | N/A |
| 1080p | 78 | 60 | 60 | 60 | 60 |

Further complicating matters, the current generation of cameras manufactured by GoPro use third-party video codecs which have proprietary hardware and/or software. The proprietary codec provides some custom codec operation but also obscures the rate control and rate-distortion optimization. In other words, the codec operation is primarily controlled via API-calls and parameters; there is no way to directly alter the rate control/distortion behaviors.

To address the specific application requirements of action photography, new solutions are needed for dynamic encoding. Ideally, new solutions should adapt a target bitrate to the complexity of the content. Real-time in-camera implementations may also benefit from low added complexity and work within the constraints of existing codecs.

Exemplary Dynamic Encoding Techniques

Various embodiments of the present disclosure dynamically configure a video encoder to achieve consistent image quality across different content complexities. Specifically, in one exemplary embodiment, the target bitrate of a codec is dynamically configured to maintain a consistent content complexity. In other words, the exemplary solutions avoid wasting bitrate on marginal quality gains for low complexity content, and increase bitrate to handle high complexity content.

As a related improvement, embedded, real-time, variants leverage the staged implementation of the image processing pipeline to provide a lightweight solution. In other words, encoding guidance from earlier pipeline stages enables predictive single-pass encoding (rather than iterative processing, or brute force parallel encoding and selection).

Figure 4:
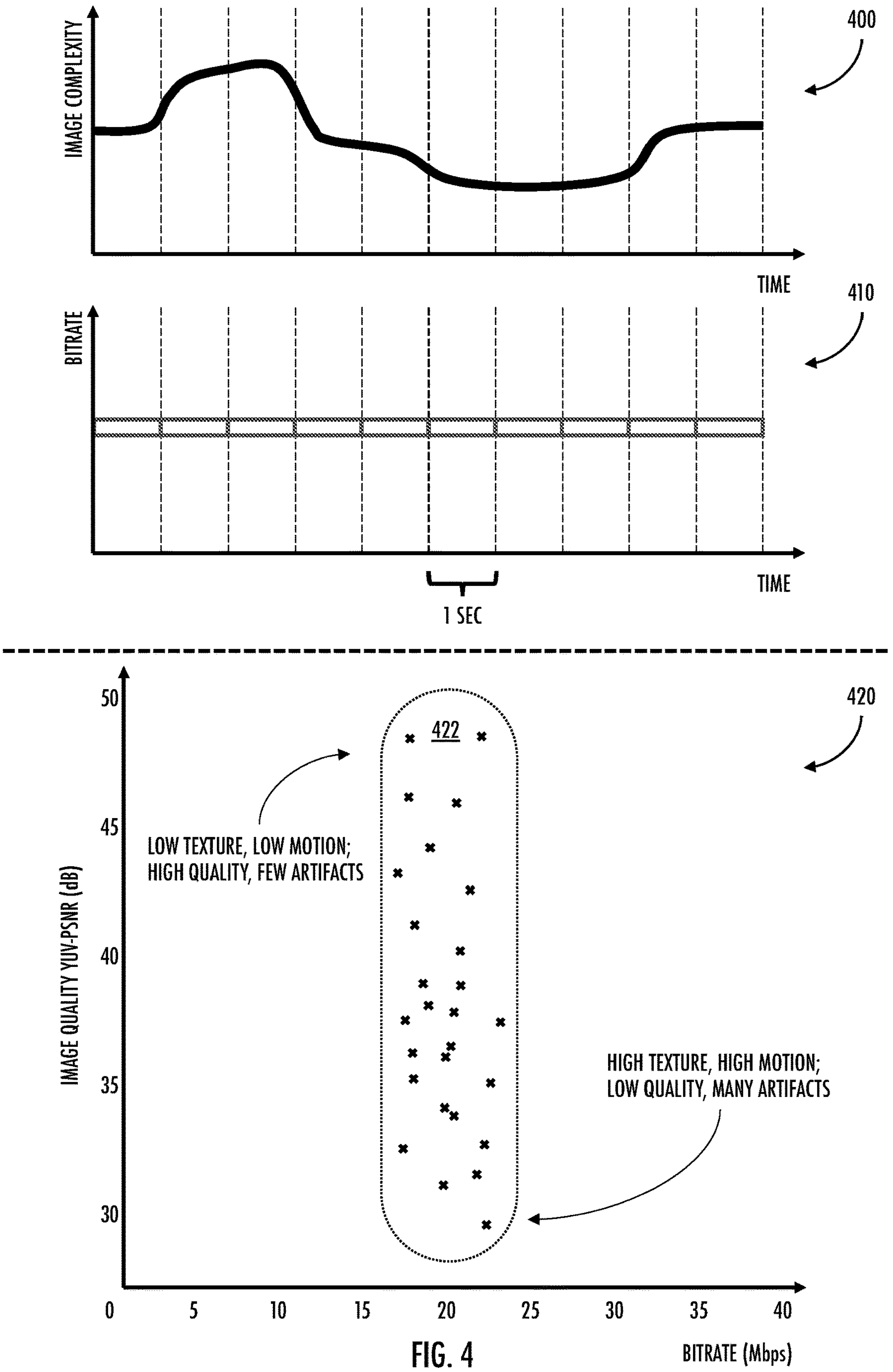
FIG. 4 depicts illustrative plots for a single-pass constant bitrate (CBR) encoding, useful for explaining various aspects of the present disclosure.

First, consider the illustrative plots for a single-pass constant bitrate (CBR) encoding, as depicted in FIG. 4. Here, a reference video is divided into 1 second increments and encoded at a constant bit rate (20 Mbps) to generate an encoded video (e.g., 1080p resolution, 30 frames per second). The CBR encoding prioritizes a consistent bitrate, and is also referred to herein as "iso-bitrate" encoding. As shown in a first plot 400, the image complexity varies over time; in other words, some portions of the reference video will have high textures and/or high motion, other portions of the reference video will have low texture and/or low motion. However, in a constant bit rate encoding, the resulting bit rate of the encoded video is held nominally constant, within a threshold tolerance (as shown in second plot 410, the bitrate is nominally 20 Mbps).

As a brief aside, bitrate selection has some threshold of tolerance over the nominal value because rate control is based on imperfect prediction. Typically, variance is caused by fluctuations in video complexity. For example, a video of low complexity that quickly switches to high complexity will create large shifts in bitrate. This is because the rate control will initially use a small quantization parameter (QP) for the low complexity, which results in high bitrate peaks for high complexity.

The third plot 420 of FIG. 4 plots the image quality of each 1 second segment of encoded video as a function of bitrate. Here, the image quality is calculated by measuring the differences between the reference video ($I_{ref}$) and the reconstructed encoded video ($I_{rec}$), using peak signal-to-noise ratio (PSNR) defined in EQN. 1, according to a mean squared error (MSE) defined in EQN. 2.

$$PSNR = 10 \times \log_{10}\left(\frac{(2^b - 1)^2}{MSE}\right) \quad \text{EQN. 1}$$

$$MSE = \frac{1}{MN}\sum_{i=0}^{M-1}\sum_{j=0}^{N-1}[I_{rec}(i, j) - I_{ref}(i, j)]^2 \quad \text{EQN. 2}$$

As shown, the iso-bitrate distribution 422 widely varies in image quality. In other words, areas of low complexity (low texture, low motion) are rendered with high quality, relatively few artifacts; in contrast, areas of high complexity (high texture and/or high motion) are rendered with low quality, multiple artifacts.

Figure 5:
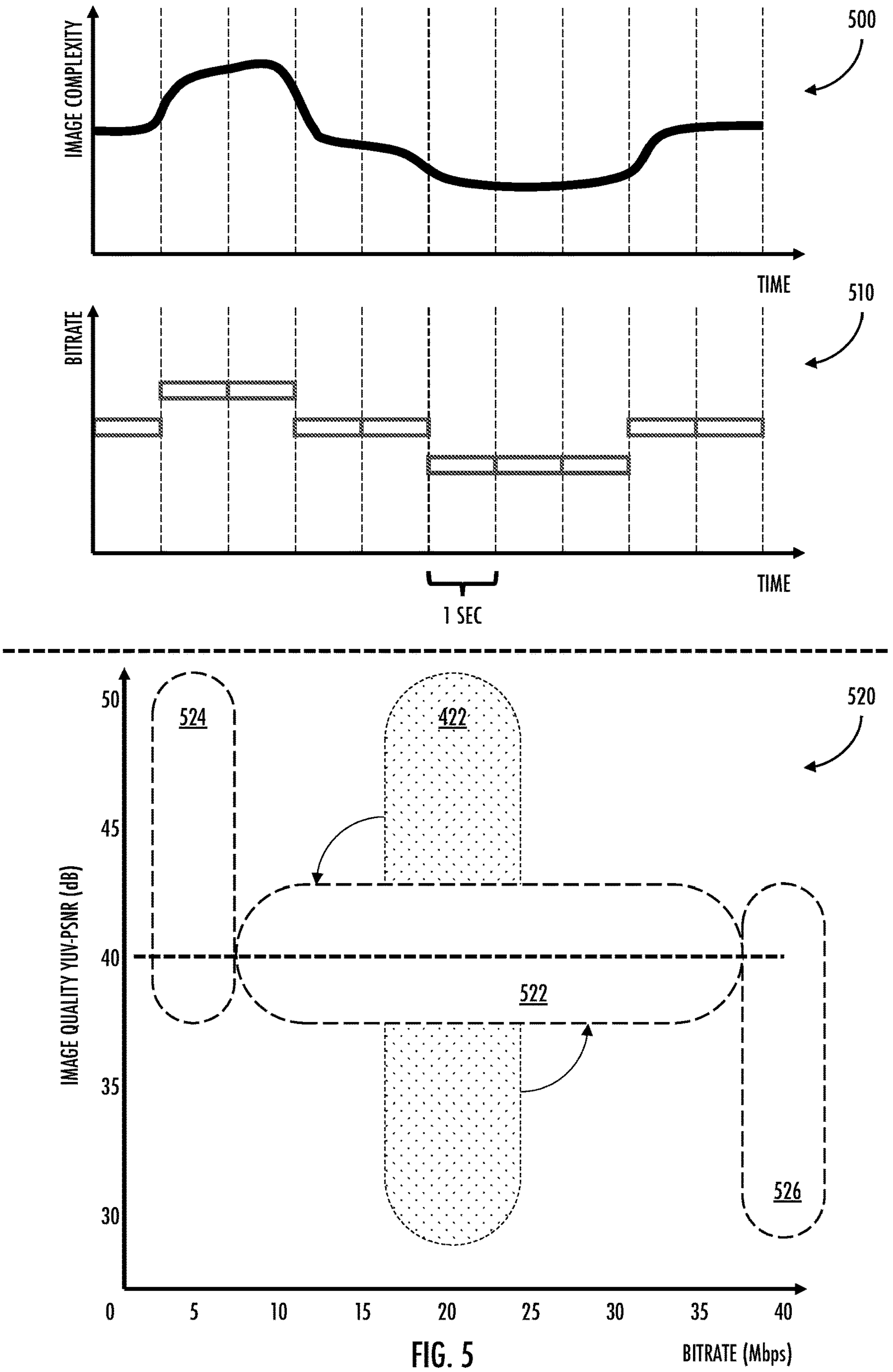
FIG. 5 depicts illustrative plots for an "iso-quality" bitrate encoding, in accordance with various aspects of the present disclosure.

In contrast, consider the illustrative plots for an exemplary single-pass image quality-priority encoding (also referred to herein as "iso-quality" encoding), as depicted in FIG. 5. Much like FIG. 4, the original sample video is divided into 1 second increments and encoded to generate an encoded video (e.g., 1080p resolution, 30 frames per second). However, instead of a constant bit rate, the bitrate of the encoder is dynamically configured based on pixel features identified in previous stages and/or encoding features identified in previous encoded frames. As discussed in greater detail below, image quality is not known until after encoding has occurred, thus pixel features and encoding features are used as proxies to predict the image complexity.

As shown in a first plot 500, the image complexity varies over time. Changes in complexity are forecasted by pixel features and/or encoding features, which are then used to dynamically configure the bitrate of the encoder (seen in second plot 510).

The third plot 520 of FIG. 5 plots the image quality of each 1 second segment of video as a function of bitrate. As before, the image quality is compared by measuring the differences between the reference video and its counterpart encoded video. However, in the exemplary implementation, the iso-quality distribution 522 provides relatively consistent image quality across a wide range of bitrates (the iso-bitrate distribution 422 is also shown for comparison). Notably, the range of adjustment is limited, thus certain configurations may result in outlying behavior. For example, image quality may increase when the bitrate drops to a "floor" bitrate (as represented by floor region 524), and decrease when the bitrate rises to a "ceiling" (as represented by ceiling region 526).

Figure 6:
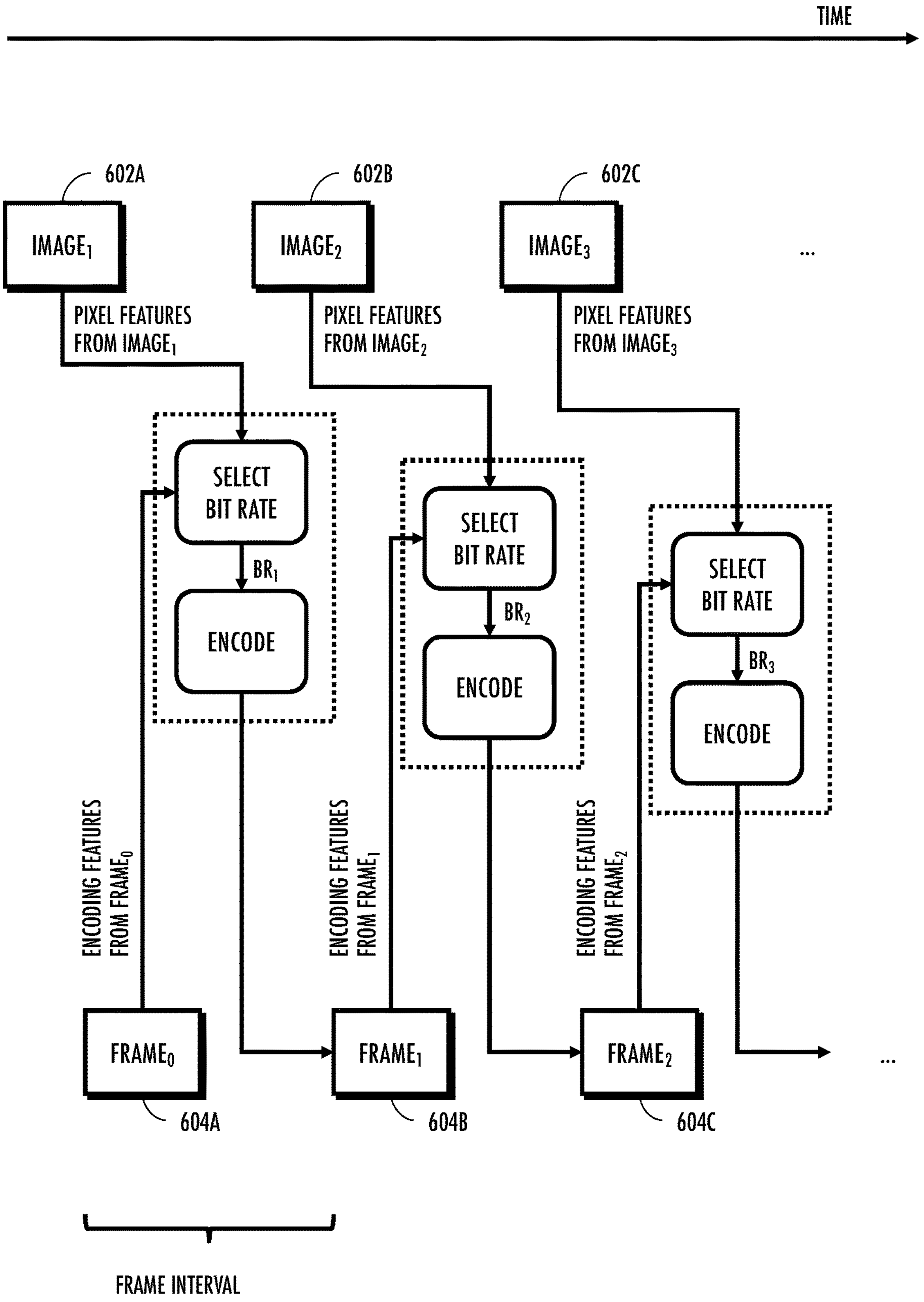
FIG. 6 depicts a graphical representation of one exemplary single-pass iso-quality encoding process, in accordance with various aspects of the present disclosure.

FIG. 6 is a graphical representation of one exemplary single-pass iso-quality encoding process. As shown, a sequence of images ($image_1$ 602A, $image_2$ 602B, $image_3$ 602C) is encoded into a sequence of frames ($frame_0$ 604A, $frame_1$ 604B, $frame_2$ 604C) in a single-pass. For example, the pixel features from $image_1$ 602A and the encoding features from $frame_0$ 604A are used to select a first $bitrate_1$ ($BR_1$), the encoder is configured according to the first $bitrate_1$ to generate $frame_1$ 604B. Similarly, the pixel features from $image_2$ 602B and the encoding features from $frame_1$ 604B are used to select a second $bitrate_2$ ($BR_2$), the encoder is configured according to the second $bitrate_2$ to generate $frame_2$ 604C, etc.

In one exemplary embodiment, "pixel features" refer to metadata extracted from the raw pixel values and/or image processing (e.g., during the first stage 102 of FIG. 1). Examples of pixel features may include, without limitation, the average, standard deviation, skewness, kurtosis, etc. of pixel values. Pixel features may additionally be subdivided into spatial features and temporal features. Examples of spatial pixel features include Gray-Level Co-Occurrence Matrix (GLCM), colorfulness measures, noise measures, and/or spatial information (as defined under ITU-T P.910, *Subjective Video Quality Assessment Methods for Multimedia Applications*, Recommendation, International Telecommunication Union, 2022, incorporated herein by reference in its entirety). Temporal features may be computed for each pair of temporally adjacent images; temporal features may include normalized cross-correlation, average of temporal coherence, standard deviation of temporal coherence, and/or temporal information (as defined under ITU-T P.910, referred to above). More broadly, any metadata that is derived, identified, or generated from the image signal processing of sensed light information into pixel data may be substituted with equal success by artisans of ordinary skill in the related arts, given the contents of the present disclosure.

In one exemplary embodiment, "encoding features" refer to metadata extracted from a previously encoded frame of video (e.g., during the third stage 106 of FIG. 1). Examples of encoding features may include, without limitation, the quantization parameters (QP) of the encoded frame (aggregated by median, minimum, maximum, amplitude between maximum and minimum, etc.), the number of bits of the encoded frame (aggregated by average, minimum, maximum, P-frame maximum, P-frame amplitude, etc.), YUV-PSNR between the encoded frame and the reference frame (aggregated by average, standard deviation, minimum, maximum, P-frame maximum, P-frame amplitude, etc.), percentage of intra blocks in the encoded frame (aggregated by median, minimum, P-frame maximum, P-frame amplitude, etc.), percentage of skip blocks in the encoded frame (aggregated by median, P-frame minimum, maximum, P-frame amplitude, etc.), and/or percentage of merge blocks in the encoded frame (aggregated by median, minimum, maximum, P-frame minimum, P-frame amplitude, etc.). More broadly, any metadata that is derived, identified, or generated from the encoding of previous frames may be substituted with equal success by artisans of ordinary skill in the related arts, given the contents of the present disclosure.

Figure 7:
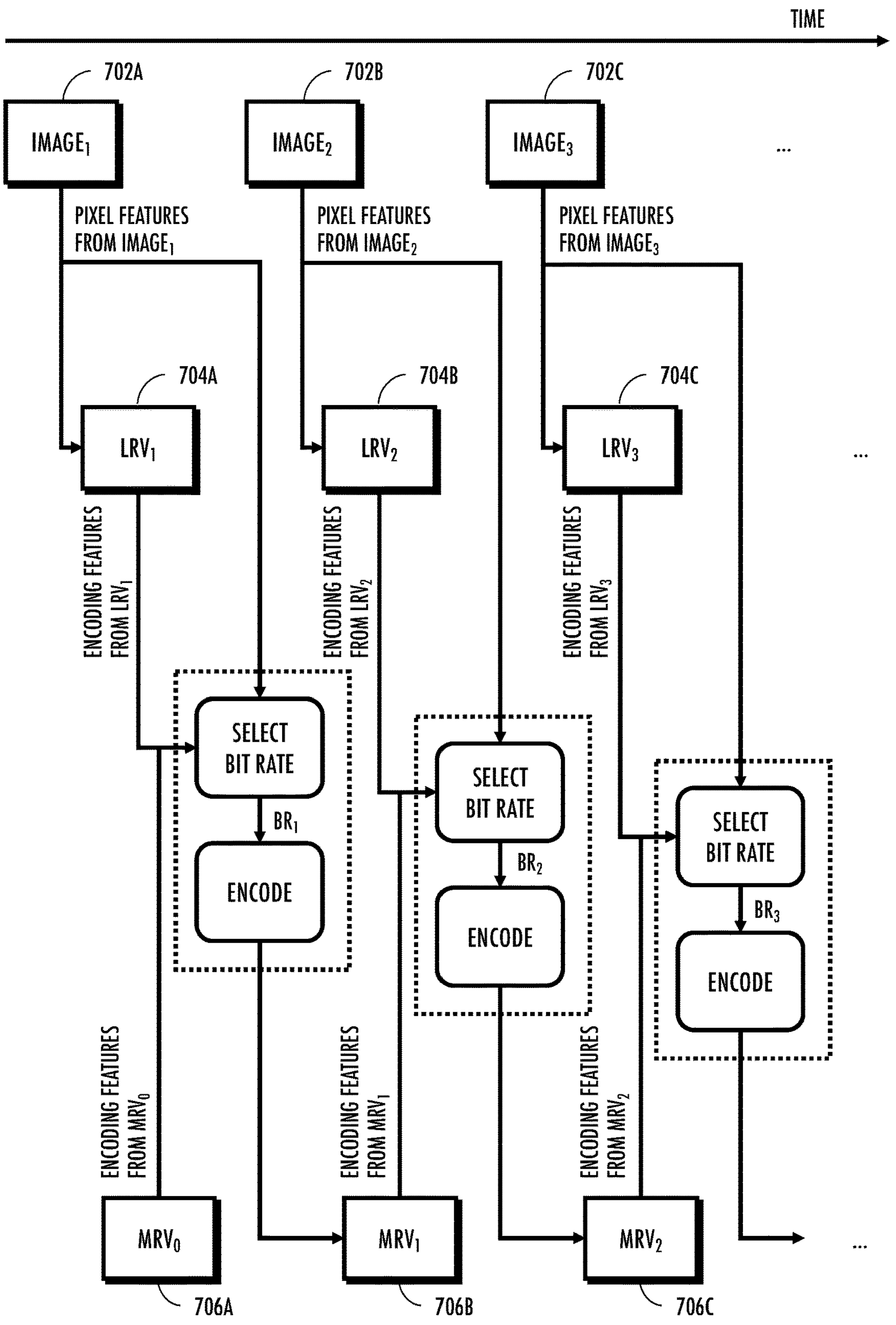
FIG. 7 depicts a graphical representation of one exemplary dual resolution iso-quality encoding process, in accordance with various aspects of the present disclosure.

While FIG. 6 depicts a single-pass encoding, the techniques are more broadly applicable to any time-constrained encoding process. Here, time-constrained refers to an encoding process that has limited information from the future and/or past (look-forward/look-behind buffers, etc.). FIG. 7 is a graphical representation of one exemplary dual resolution iso-quality encoding process. Dual encoding provides a low resolution video to be used for reducing playback or post-capture processing, and a main resolution video for high-quality post-processing.

As shown, a sequence of images ($image_1$ 702A, $image_2$ 702B, $image_3$ 702C) is encoded into a first sequence of low resolution frames (LRV $frame_1$ 704A, LRV $frame_2$ 704B, LRV $frame_3$ 704C) and a second sequence of main resolution frames (MRV $frame_0$ 706A, MRV $frame_1$ 706B, MRV $frame_2$ 706C). Note that in this implementation, the LRV frames are encoded prior to their MRV counterparts (e.g., LRV $frame_1$ 704A is successfully encoded before MRV $frame_1$ 706B has started encoding). In this example, the pixel features from $image_1$ 702A, the encoding features from LRV $frame_1$ 704A, and the encoding features from MRV frame. 706A are used to select a first $bitrate_1$ ($BR_1$), the encoder is configured according to the first $bitrate_1$ to generate MRV $frame_1$ 706B. Similarly, the pixel features from $image_2$ 702B, the encoding features from LRV $frame_2$ 704B, and the encoding features from MRV $frame_1$ 706B are used to select a second $bitrate_2$ ($BR_2$), the encoder is configured according to the second $bitrate_2$ to generate MRV $frame_2$ 706C, etc.

More generally, the techniques described herein may be broadly applied to dynamic encoding for any optimization target, based on proxy information obtained from previous stages of a pipeline processing. Here, image quality/bitrate may be generalized to subjective levels of image quality e.g., "fair quality", "high quality", "visually lossless quality", etc. While the foregoing discussion is presented in the context of bitrate, other implementations might optimize for computational complexity, memory use, bandwidth, image quality, and/or any combination of the foregoing. Furthermore, while the foregoing discussion is presented in the context of pixel features and encoding features, other implementations might consider various other forms of metadata including without limitation: stabilization data, stitching data, user configurations, filtering data, and/or other capture information.

Proxy Data and In-Camera Machine Learning Variants

While various concepts of the present disclosure are illustrated with reference to a graphical representation of image quality as a function of bitrate, most practical applications do not have reference images (i.e., there is no reference image for a real world setting). Here, machine learning implementations enable "open-loop" operation that is particularly useful when using proxy data to optimize for an unmeasurable image quality.

Exemplary embodiments of the present disclosure utilize the pixel features and/or encoding features as a proxy for the optimization target. Here, the term "proxy" and its linguistic derivatives refers to information that is representative of target data. Proxy data may be useful where the target data cannot be directly measured or observed. For example, the pixel features and encoding features are predictive of the image quality of an encoding process which has not yet occurred. Similarly, captured image data may not have a reference image to compare against (i.e., image quality is also unknown). More broadly, proxy data may be useful in any application where the target data is unknown, inaccessible, or otherwise unavailable.

Proxy data is usually only representative of the target data to a degree of accuracy and/or precision. Here, accuracy refers to the magnitude of error between the proxy data and the target data, whereas precision refers to the consistency of error across multiple iterations. The degree of representation may be qualified and/or quantified according to any numerical and/or statistical analysis; usually, it is expressed in terms of a margin of error, standard deviation, or other similar metric.

Conceptually, the errors for each individual proxy data may be uncorrelated to other proxies, thus leveraging the "diversity" of multiple proxies can be used to improve the overall degree of representation. There are a variety of statistical and/or numerical techniques for combining different proxy data.

As a separate but related tangent, advances in machine learning have resulted in widespread adoption of machine learning chips; these chips are particularly useful for implementing adaptive behaviors in real-time applications. Adaptive behaviors are often implicitly described ("learned" through training examples), rather than explicitly defined (formalized according to rules).

Machine learning models are "trained" against a training library of data ("offline" or "closed-loop" mode). In closed-loop operation, the model can use feedback to improve and correct undesirable results. For example, within the context of the present disclosure, a machine learning model may use pixel features and encoding features to train for a target image quality (PSNR) between the encoded images and the reference images. Once the model generates acceptable results for the training library, it may be switched to real world data ("online" or "open-loop" mode). During online operation, the model uses its trained behavior to generate results without error-based feedback. In other words, the machine learning model does not need to compare the resulting encoded images with reference images to determine image quality.

In one exemplary embodiment, machine learning logic is used to select an optimization target based on pixel features and/or encoding features. In one specific implementation, a "random forest" machine learning logic provides bitrate selection within the embedded constraints of the camera device. A "random forest" refers to an ensemble learning method for classification or regression tasks. A random forest is typically composed of a collection of decision trees, each decision tree is a node that generates a decision based on the values of its inputs. Each decision tree is trained independently on a random subset of the training data and makes its own predictions. In addition to using random subsets of data, random forest training also introduces an additional level of randomness by considering only a random subset of features at each split in the decision tree. This helps to decorrelate the individual trees and improves the overall model's robustness. During a classification task, the random forest combines the predictions of individual trees through a majority voting mechanism. For regression tasks, it averages the predictions of individual trees.

Random forests are well-suited for noisy data and generalize well to new, unseen examples. The combination of multiple trees helps reduce overfitting, making the model more robust. Random forests also provide a measure of feature importance, indicating the contribution of each feature to the model's predictions. This can be useful for understanding the most influential factors in a given problem.

In another implementation, the machine learning logic may use gradient boosted trees (GBTs) to provide bitrate selection. Gradient boosting is a technique that builds an additive model in a forward stage-wise manner, where each new tree corrects the errors of the previously trained trees. A GBT is typically composed of shallow decision trees, often referred to as "base learners" or "weak learners" because their predictions are only slightly better than random guessing (50/50). Trees are added sequentially, and each tree is trained to correct the residuals (the differences between the actual and predicted values) of the ensemble of trees built so far; in other words, the weak learners are arranged in sequence such that each subsequent tree is focused on correcting the errors made by its preceding trees.

The training algorithm uses a gradient boosting technique to add trees to minimize the ensemble's loss function; the algorithm identifies the direction in which the loss function is steepest (gradient) and updates the model in that direction. In some variants, a learning rate parameter is used to control the contribution of each tree to the overall ensemble. A lower learning rate makes the model more robust but requires more trees to achieve similar performance. Similarly, GBTs may include regularization techniques to prevent overfitting, such as limiting the depth of each tree or adding penalties for complex models.

In one exemplary embodiment, the machine learning logic is trained to perform classification of images using proxy data. Classification refers to the general field of machine learning techniques for labeling input data. In this case, the machine learning logic is trained to classify the input images according to complexity based on pixel features and/or encoding features; the resulting classification is used to select the appropriate bitrate. In one specific example, the training samples may be taken from a library of videos, segmented into 1 second chunks, for each previous encoding bitrate (and, in some cases, current LRV encoding bitrate), and each PSNR threshold. The machine learning logic is trained against a "ground-truth label" which is based on the actual PSNR of the encoded videos compared to the reference videos. Some training techniques may additionally weight samples based on the impact of misclassification and/or provide ordinal classification (ordered classes).

More generally, the techniques described herein may be broadly applied to any scheme for mapping proxy data to an optimization target data. While the foregoing discussion is presented in the context of machine learning, other implementations might use explicit rules and logic that govern the optimization behavior. Explicit rules are comparatively less complex and may incorrectly handle unknown scenarios, however, they are simpler to implement and can be performed with fewer resource utilization (processing cycles, memory space, power, etc.).

Floor and Ceiling Variants

As previously alluded to, the exemplary iso-quality encoding implementations may have "floor" and "ceiling" regions where the control parameter (bitrate) is outside the adjustment range of the optimization target (image quality). Some implementations may assume that floor and ceiling behavior is rare, or otherwise acceptable "as-is". Other implementations may use special handling for these regions.

Figure 8:
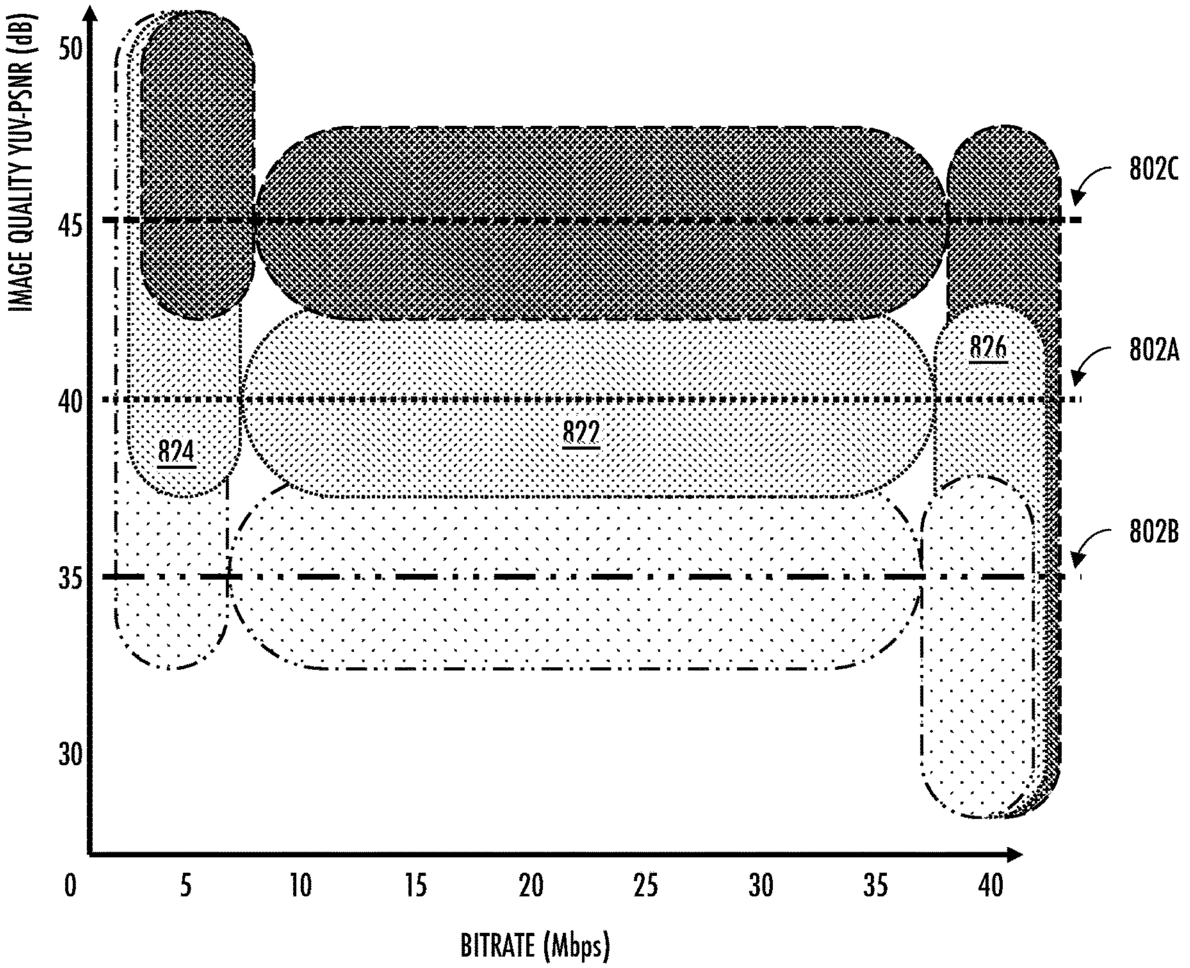
FIG. 8 depicts a graphical representation of a first floor-ceiling variant of an iso-quality encoding process, in accordance with various aspects of the present disclosure.

One exemplary implementation dynamically adjusts the optimization target based on bitrate selection within the floor and ceiling regions. Consider the example of FIG. 8 where the optimization target is initially set to a first image quality 802A; this optimization target has an iso-quality distribution region 822 where the bitrate can be dynamically adjusted, a floor region 824 where the bitrate cannot be further decreased, and a ceiling region 826 where the bitrate cannot be further increased. During normal (iso-quality) operation, the bitrate selection logic selects bitrates based on proxy data within the iso-quality distribution region 822. However, if proxy data forecasts very high complexity (high texture, high motion) that would select bitrates in the ceiling region 826, then the optimization target (image quality) may be decreased to 802B (with corresponding adjustments to its iso-quality region, floor region, and ceiling region). Conversely, if proxy data forecasts very low complexity (low texture, low motion) that would select bitrates in the floor region 824, then the optimization target may be increased to 802C (with corresponding adjustments to the iso-quality region, floor region, and ceiling region).

Figure 9:
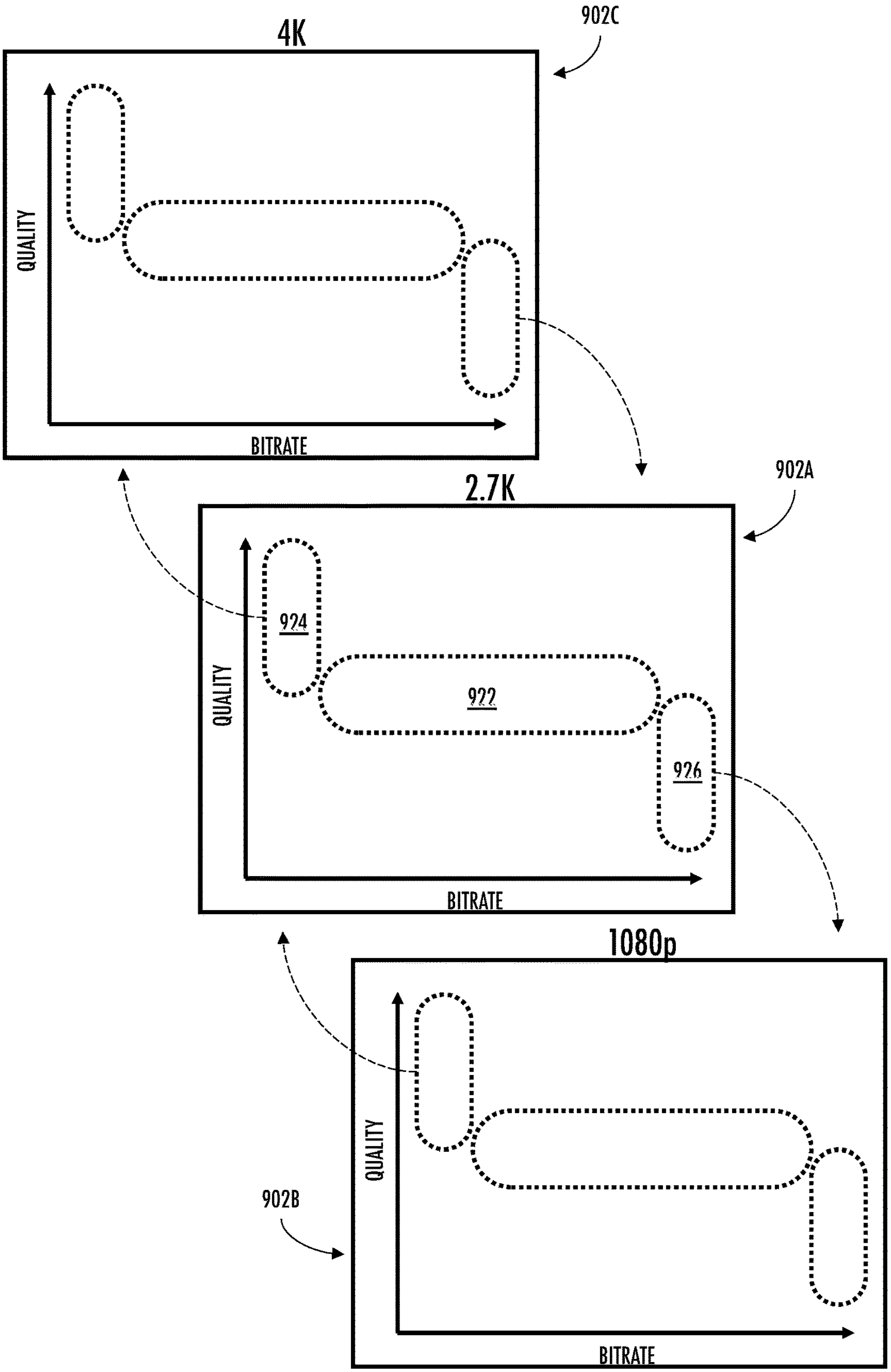
FIG. 9 depicts a graphical representation of a second floor-ceiling variant of an iso-quality encoding process, in accordance with various aspects of the present disclosure.

Another exemplary implementation dynamically adjusts the video resolution based on bitrate selection within the floor and ceiling regions. Consider the example of FIG. 9 where the video resolution is initially set to a first resolution 902A; this resolution has an iso-quality distribution region 922 where the bitrate can be dynamically adjusted, a floor region 924 where the bitrate cannot be further decreased, and a ceiling region 926 where the bitrate cannot be further increased. During normal (iso-quality) operation, the bitrate selection logic selects bitrates based on proxy data within the iso-quality distribution region 922. However, if proxy data forecasts very high complexity (high texture, high motion) that would select bitrates in the ceiling region 926, then the resolution may be decreased to 902B. Conversely, if proxy data forecasts very low complexity (low texture, low motion) that would select bitrates in the floor region 924, then the resolution may be increased to 902C.

The foregoing examples demonstrate various modalities of dynamic codec configuration. Here, a first mode of operation (modality) may adjust codec parameters based on an optimization target. For example, bitrate may be adjusted to maintain a consistent image quality (iso-quality). This modality may provide "fine adjustments" that occur on a periodic basis e.g., every frame interval and/or GOP interval (once every second, etc.). A second mode may adjust the optimization target itself (e.g., changing the target image quality); this modality may provide "coarse adjustments" on an aperiodic basis, but no more frequently than frame interval or GOP interval granularity. A third mode may affect the codec parameters (e.g., resolution, frame rate, GOP structure, etc.); these may be "gross adjustments" that may change the codec pipeline state (e.g., flush stale data, reset codec state, etc.) and/or codec timing/latency. More generally, the various techniques described herein may be broadly extended to any dynamic encoding system with multiple modalities, where each modality encapsulates a specific set of conditions, behaviors, or characteristics of the encoding process.

Various implementations may additionally incorporate hysteresis and/or differential information to switch between modalities. For example, a hysteretic system might consider the time averaged bitrates to avoid resist sudden changes in bitrate (avoiding "churn"). Similarly, a differential system might consider the difference between current, previous, and/or next bitrates to quickly compensate for large shifts in bitrates. Various other schemes for addressing "leading" and "lagging" shifts are readily appreciated by artisans of ordinary skill in the related arts, given the contents of the present disclosure.

Technological Improvements and Other Considerations

The above-described system and method solves a technological problem in industry practice related to encoder configuration for real-time capture. Conventional video encoding techniques are optimized for content delivery networks which encode-once-deliver-often. As a practical matter, conventional encoders have an unconstrained ability to look-forward or look-backward in the video to maximize compression and video quality. In many cases, such encoders improve compression performance by increasing the search space-both in the number of frames held in memory as well as in-frame pixel searches for motion estimation. These techniques are often performed at "best-effort" with unconstrained processing power and memory. Action photography often must capture footage in real-time as it occurs. additionally, the form factor requirements for action cameras can impose aggressive embedded constraints (processing power, memory space). More directly, the technique described above overcomes a problem that was introduced by, and rooted in, the unconventional nature of action photography.

As a related noted, conventional video encoding assumes a division of tasks between specialized devices. For example, studio-quality footage is typically captured with specialized cameras, and encoding is optimized for compute intensive environments such as server farms and cloud computing, etc. An embedded device creates opportunities for efficiencies that are not otherwise available in distinct devices. For example, the action camera may have a shared memory between various processing units that allows in-place data processing, rather than moving data across a data bus between processing units. As one specific optimization, the in-camera image signal processing (ISP) and/or dual encoding (e.g., LRV/MRV) may provide pixel feature and/or encoding feature information that can be used as input for ongoing encoding operation. More directly, the techniques described throughout enable specific improvements to the operation of a computer, particularly those of a mobile/embedded nature.

Furthermore, the various techniques described throughout leverage supplemental data to improve real-time encoding of a primary data stream. As but one such example, image signal processing (ISP) data and/or low resolution video (LRV) are supplemental data and are not widely available on generic camera or computing apparatus. Furthermore, conventional encoded media also does not include supplemental data since they are not displayed during normal replay. Thus, the improvements described throughout are tied to specific components that play a significant role in real-time encoding.

System Architecture

Figure 10:
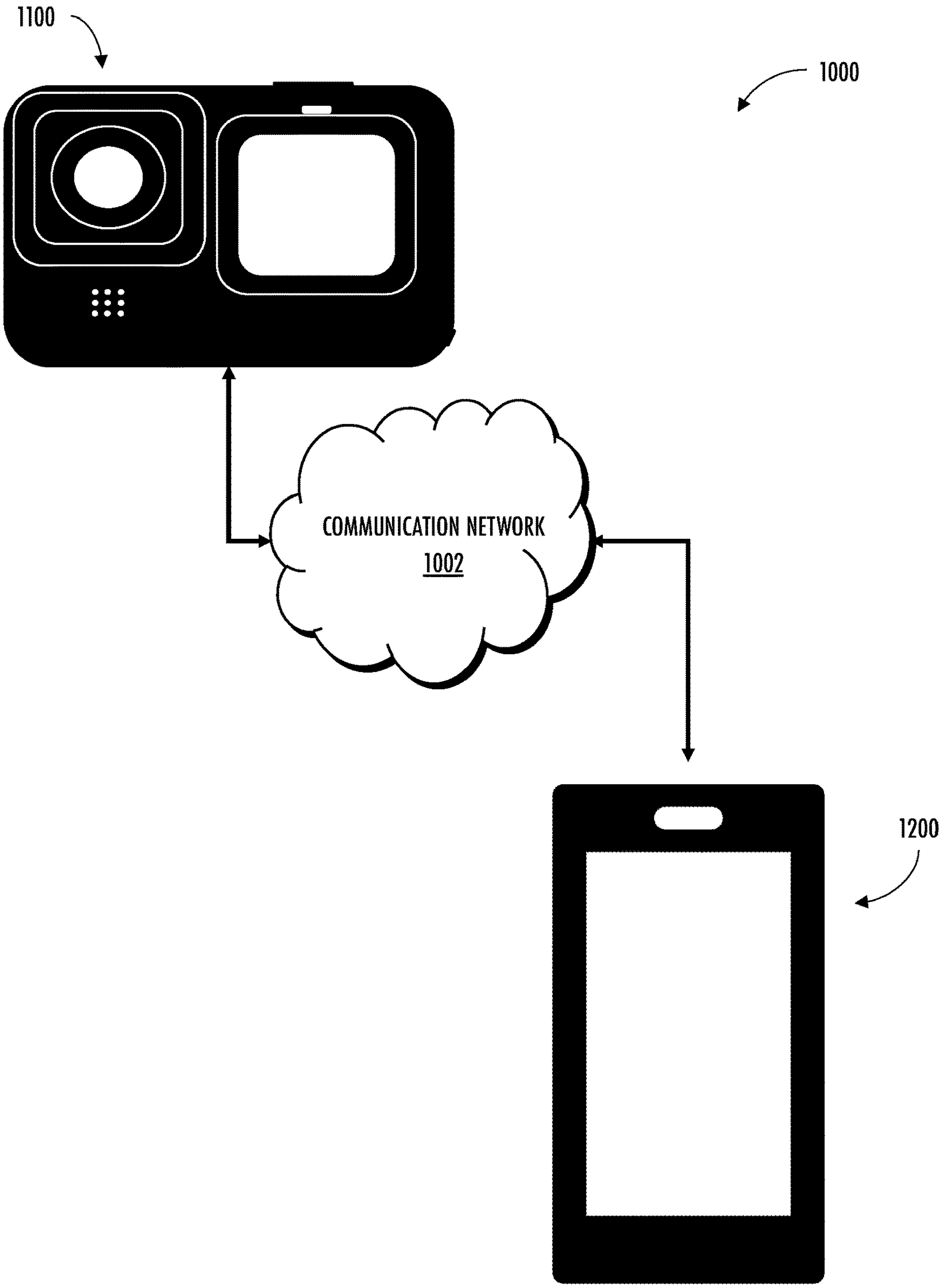
FIG. 10 depicts a logical block diagram of the exemplary system, in accordance with various aspects of the present disclosure.

FIG. 10 is a logical block diagram of the exemplary system 1000 that includes: an encoding device 1100, a decoding device 1200, and a communication network 1002. The encoding device 1100 may capture data and encode the captured data in real-time (or near real-time) for transfer to the decoding device 1200 directly or via communication network 1002. In some cases, the video may be live streamed over the communication network 1002.

While the following discussion is presented in the context of an encoding device 1100 and a decoding device 1200, artisans of ordinary skill in the related arts will readily appreciate that the techniques may be broadly extended to other topologies and/or systems. For example, the encoding device may transfer an iso-quality encoded video to a streaming server for live streaming (e.g., which may require re-encoding to iso-bitrate formats) to a streaming client. As another example, a capture device may capture media at constant bit rate (possibly with metadata) which is provided to an encoding device for iso-quality encoding.

The following discussion provides functional descriptions for various logical entities of the exemplary system 1000. Artisans of ordinary skill in the related art will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system 1000 is separately provided below.

Functional Overview of the Encoding Device

Functionally, an encoding device 1100 encodes a sequential stream of images as video based on proxy data. In one aspect, the encoding device 1100 collects and/or generates proxy data to predict image quality with machine learning logic for encoding. In another aspect, the encoding device 1100 performs real-time (or near real-time) encoding with a nominally consistent image quality (iso-quality). In yet another aspect, the encoding device 1100 may shift between different modalities of encoding control.

The techniques described throughout may be broadly applicable to encoding devices such as cameras including action cameras, digital cameras, digital video cameras; cellular phones; laptops; smart watches; and/or IoT devices. For example, a smart phone or laptop may be able to capture and process video. Various other applications may be substitute with equal success by artisans of ordinary skill, given the contents of the present disclosure.

Figure 11:
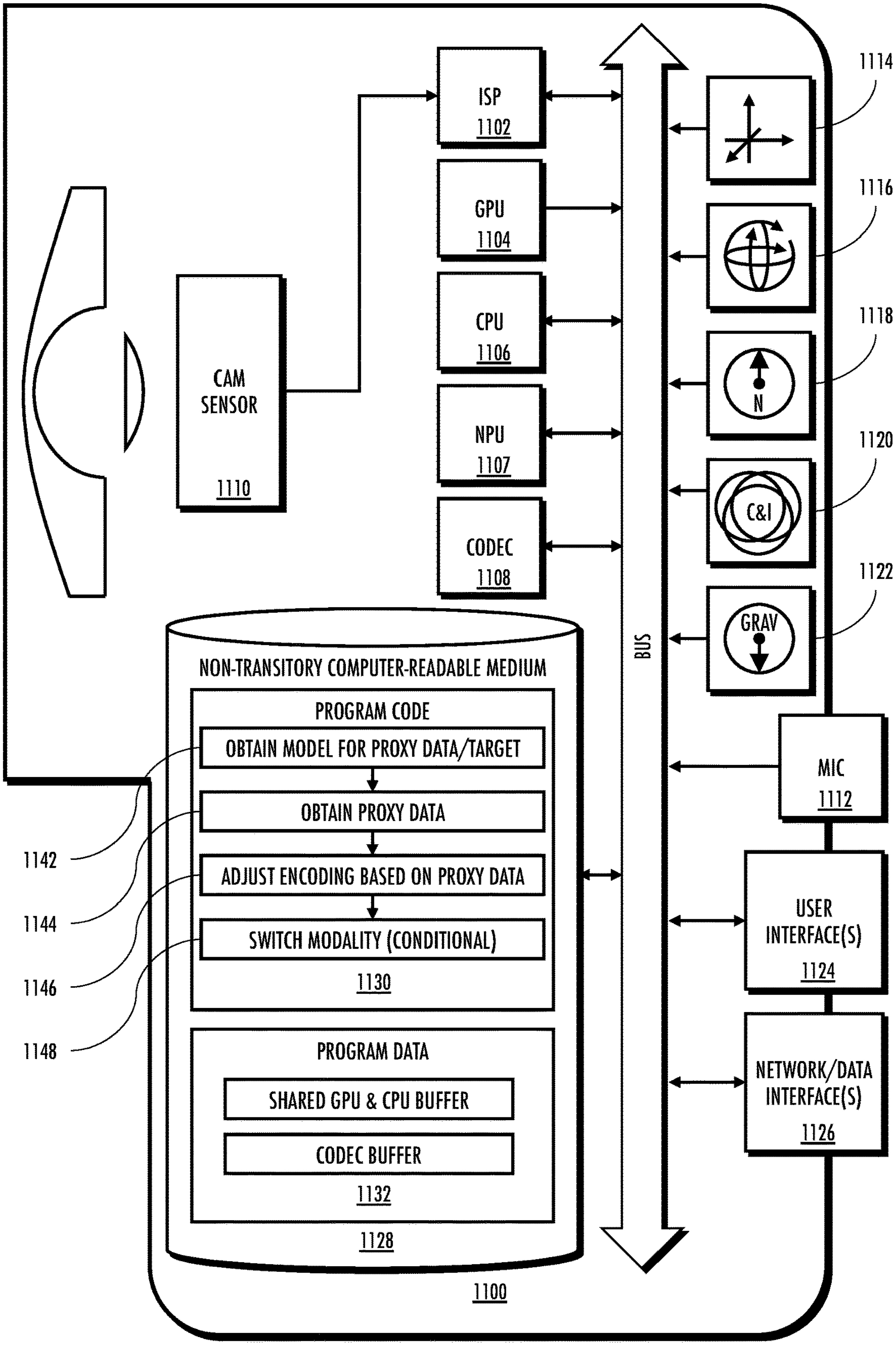
FIG. 11 depicts a logical block diagram of an exemplary encoding device, in accordance with various aspects of the present disclosure.

FIG. 11 is a logical block diagram of an exemplary encoding device 1100. The encoding device 1100 includes: a sensor subsystem, a user interface subsystem, a communication subsystem, a control and data subsystem, and a bus to enable data transfer. The following discussion provides a specific discussion of the internal operations, design considerations, and/or alternatives, for each subsystem of the exemplary encoding device 1100.

As used herein, the term "real-time" refers to tasks that must be performed within definitive constraints; for example, a video camera must capture each frame of video at a specific rate of capture (e.g., 30 frames per second (fps)). As used herein, the term "near real-time" refers to tasks that must be performed within definitive time constraints once started; for example, a smart phone may use near real-time rendering for each frame of video at its specific rate of display, however some queueing time may be allotted prior to display.

Unlike real-time tasks, so-called "best-effort" refers to tasks that can be handled with variable bit rates and/or latency. Best-effort tasks are generally not time sensitive and can be run as low-priority background tasks (for even very high complexity tasks), or queued for cloud-based processing, etc.

Functional Overview of the Sensor Subsystem

Functionally, the sensor subsystem senses the physical environment and captures and/or records the sensed environment as data. In some embodiments, the sensor data may be stored as a function of capture time (so-called "tracks"). Tracks may be synchronous (aligned) or asynchronous (non-aligned) to one another. In some embodiments, the sensor data may be compressed, encoded, and/or encrypted as a data structure (e.g., MPEG, WAV, etc.)

The illustrated sensor subsystem includes: a camera sensor 1110, a microphone 1112, an accelerometer (ACCL 1114), a gyroscope (GYRO 1116), and a magnetometer (MAGN 1118).

Other sensor subsystem implementations may multiply, combine, further sub-divide, augment, and/or subsume the foregoing functionalities within these or other subsystems. For example, two or more cameras may be used to capture panoramic (e.g., wide or 360°) or stereoscopic content. Similarly, two or more microphones may be used to record stereo sound.

In some embodiments, the sensor subsystem is an integral part of the encoding device 1100. In other embodiments, the sensor subsystem may be augmented by external devices and/or removably attached components (e.g., hot-shoe/cold-shoe attachments, etc.) The following sections provide detailed descriptions of the individual components of the sensor subsystem.

Camera Implementations and Design Considerations

In one exemplary embodiment, a camera lens bends (distorts) light to focus on the camera sensor 1110. In one specific implementation, the optical nature of the camera lens is mathematically described with a lens polynomial. More generally however, any characterization of the camera lens' optical properties may be substituted with equal success; such characterizations may include without limitation: polynomial, trigonometric, logarithmic, look-up-table, and/or piecewise or hybridized functions thereof. In one variant, the camera lens provides a wide field-of-view greater than 90°; examples of such lenses may include e.g., panoramic lenses 120° and/or hyper-hemispherical lenses 180°.

In one specific implementation, the camera sensor 1110 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image.

More generally however, the various techniques described herein may be broadly applied to any camera assembly; including e.g., narrow field-of-view (30° to 90°) and/or stitched variants (e.g., 360° panoramas). While the foregoing techniques are described in the context of perceptible light, the techniques may be applied to other EM radiation capture and focus apparatus including without limitation: infrared, ultraviolet, and/or X-ray, etc.

As a brief aside, "exposure" is based on three parameters: aperture, ISO (sensor gain) and shutter speed (exposure time). Exposure determines how light or dark an image will appear when it's been captured by the camera(s). During normal operation, a digital camera may automatically adjust one or more settings including aperture, ISO, and shutter speed to control the amount of light that is received. Most action cameras are fixed aperture cameras due to form factor limitations and their most common use cases (varied lighting conditions)—fixed aperture cameras only adjust ISO and shutter speed. Traditional digital photography allows a user to set fixed values and/or ranges to achieve desirable aesthetic effects (e.g., shot placement, blur, depth of field, noise, etc.).

The term "shutter speed" refers to the amount of time that light is captured. Historically, a mechanical "shutter" was used to expose film to light; the term shutter is still used, even in digital cameras that lack of such mechanisms. For example, some digital cameras use an electronic rolling shutter (ERS) that exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time, but they are not erased/read at the same time since the pointers scan through the rows. A faster shutter speed has a shorter capture time, a slower shutter speed has a longer capture time.

A related term, "shutter angle" describes the shutter speed relative to the frame rate of a video. A shutter angle of 360° means all the motion from one video frame to the next is captured, e.g., video with 24 frames per second (FPS) using a 360° shutter angle will expose the photosensitive sensor for 1/24th of a second. Similarly, 120 FPS using a 360° shutter angle exposes the photosensitive sensor 1/120th of a second. In low light, the camera will typically expose longer, increasing the shutter angle, resulting in more motion blur. Larger shutter angles result in softer and more fluid motion, since the end of blur in one frame extends closer to the start of blur in the next frame. Smaller shutter angles appear stuttered and disjointed since the blur gap increases between the discrete frames of the video. In some cases, smaller shutter angles may be desirable for capturing crisp details in each frame. For example, the most common setting for cinema has been a shutter angle near 180°, which equates to a shutter speed near 1/48th of a second at 24 FPS. Some users may use other shutter angles that mimic old 1950's newsreels (shorter than 180°).

In some embodiments, the camera resolution directly corresponds to light information. In other words, the Bayer sensor may match one pixel to a color and light intensity (each pixel corresponds to a photosite). However, in some embodiments, the camera resolution does not directly correspond to light information. Some high-resolution cameras use an N-Bayer sensor that groups four, or even nine, pixels per photosite. During image signal processing, color information is re-distributed across the pixels with a technique called "pixel binning". Pixel-binning provides better results and versatility than just interpolation/upscaling. For example, a camera can capture high resolution images (e.g., 108 MPixels) in full-light; but in low-light conditions, the camera can emulate a much larger photosite with the same sensor (e.g., grouping pixels in sets of 9 to get a 12 MPixel "nona-binned" resolution). Unfortunately, cramming photosites together can result in "leaks" of light between adjacent pixels (i.e., sensor noise). In other words, smaller sensors and small photosites increase noise and decrease dynamic range.

Microphone Implementations and Design Considerations

In one specific implementation, the microphone 1112 senses acoustic vibrations and converts the vibrations to an electrical signal (via a transducer, condenser, etc.) The electrical signal may be further transformed to frequency domain information. The electrical signal is provided to the audio codec, which samples the electrical signal and converts the time domain waveform to its frequency domain representation. Typically, additional filtering and noise reduction may be performed to compensate for microphone characteristics. The resulting audio waveform may be compressed for delivery via any number of audio data formats.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/speech system to mimic voice communications. Speech codecs often make significant trade-offs to preserve intelligibility, pleasantness, and/or data transmission considerations (robustness, latency, bandwidth, etc.)

More generally however, the various techniques described herein may be broadly applied to any integrated or handheld microphone or set of microphones including, e.g., boom and/or shotgun-style microphones. While the foregoing techniques are described in the context of a single microphone, multiple microphones may be used to collect stereo sound and/or enable audio processing. For example, any number of individual microphones can be used to constructively and/or destructively combine acoustic waves (also referred to as beamforming).

IMU Implementations and Design Considerations

The inertial measurement unit (IMU) includes one or more accelerometers, gyroscopes, and/or magnetometers. In one specific implementation, the accelerometer (ACCL 1114) measures acceleration and gyroscope (GYRO 1116) measure rotation in one or more dimensions. These measurements may be mathematically converted into a four-dimensional (4D) quaternion to describe the device motion, and electronic image stabilization (EIS) may be used to offset image orientation to counteract device motion (e.g., CORI/IORI 1120). In one specific implementation, the magnetometer (MAGN 1118) may provide a magnetic north vector (which may be used to "north lock" video and/or augment location services such as GPS), similarly the accelerometer (ACCL 1114) may also be used to calculate a gravity vector (GRAV 1122).

Typically, an accelerometer uses a damped mass and spring assembly to measure proper acceleration (i.e., acceleration in its own instantaneous rest frame). In many cases, accelerometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both device direction and speed).

More generally, however, any scheme for detecting device velocity (direction and speed) may be substituted with equal success for any of the foregoing tasks. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Generalized Sensor-Based Proxy Data

As previously noted, exemplary embodiments of the present disclosure use sensed data to create sensor-based proxy data for the control and data subsystem in real-time (or near real-time). For example, some image sensors can identify characteristics of pixel data which are related to image textures (average, standard deviation, skewness, kurtosis, etc. of pixel values) which could be used to infer the likelihood of high texture content. This may introduce a variety of different encoding issues (e.g., aliasing occurs when repeating patterns are sampled, banding occurs when gradients are quantized, etc.). Other examples include e.g., inferring the likelihood of motion blur from camera motion and/or subject motion. Additionally, sensors of the image processing pipeline may collect information for e.g., autofocus, color correction, white balance, and/or other automatic image enhancements.

Conceptually, motion and texture are often closely related to image complexity; both of these factors may be sensed by in-device sensors. For example, an IMU may be used to physically sense device motion; while device motion is not a perfect analog to apparent motion of the video, the two are often very closely related. Similarly, many camera sensors include logic that automatically detects certain types of textures and patterns—this information may be useful for object detection, face detection, etc. Such information may also be used as a proxy for image textures, etc. More generally, sensor-based proxy data may be broadly extended to any sensed data that might affect the sampled data quality (and by extension encoding quality).

A variety of different factors may affect the sensor operation (and by extension the resulting sampled data quality). Some image sensors can infer operation outside of their expected or calibrated range which might introduce noise (e.g., received light may be below a minimum ISO setting which would be likely to result in grainy images). As another example, very large or very small magnitude gradients may be affected by sensor tolerances. More generally, sensor-based proxy data for operational conditions could be used as proxy data for sample quality. Examples might include conditions that affect sensor sensitivity, analog-to-digital conversion (bit depth, quantization, etc.), accuracy/precision (signal-to-noise ratio), resolution, range, linearity, response time, stability, environmental conditions, durability/age, power consumption, etc.

While the foregoing discussion is presented in the context of photography, the techniques are broadly applicable to any media (e.g., audio, visual, haptic, etc.). For example, audio encoding could benefit from certain types of sensor-based proxy data. For example, a directional or stereo microphone may capture audio waveforms and use inertial measurements to infer the likelihood of motion-based sound artifacts. Similarly, certain types of noise (e.g., wind noise, etc.) can greatly affect the resulting dynamic audio quality (e.g., whispers, shouting, etc.). Additionally, while the discussions presented throughout are discussed in the context of media that is suitable for human consumption, the techniques may be applied with equal success for other types of environmental data (e.g., temperature, LiDAR, RADAR, SONAR, etc.). Such data may be useful in applications including without limitation: computer vision, industrial automation, self-driving cars, internet of things (IoT), etc.

Functional Overview of the User Interface Subsystem

Functionally, the user interface subsystem 1124 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 1124 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

Other user interface subsystem 1124 implementations may multiply, combine, further sub-divide, augment, and/or subsume the foregoing functionalities within these or other subsystems. For example, the audio input may incorporate elements of the microphone (discussed above with respect to the sensor subsystem). Similarly, IMU based input may incorporate the aforementioned IMU to measure "shakes", "bumps" and other gestures.

In some embodiments, the user interface subsystem 1124 is an integral part of the encoding device 1100. In other embodiments, the user interface subsystem may be augmented by external devices (such as the decoding device 1200, discussed below) and/or removably attached components (e.g., hot-shoe/cold-shoe attachments, etc.) The following sections provide detailed descriptions of the individual components of the sensor subsystem.

Touchscreen and Buttons Implementation and Design Considerations

In some embodiments, the user interface subsystem 1124 may include a touchscreen panel. A touchscreen is an assembly of a touch-sensitive panel that has been overlaid on a visual display. Typical displays are liquid crystal displays (LCD), organic light emitting diodes (OLED), and/or active-matrix OLED (AMOLED). Touchscreens are commonly used to enable a user to interact with a dynamic display, this provides both flexibility and intuitive user interfaces. Within the context of action cameras, touchscreen displays are especially useful because they can be sealed (waterproof, dust-proof, shock-proof, etc.)

Most commodity touchscreen displays are either resistive or capacitive. Generally, these systems use changes in resistance and/or capacitance to sense the location of human finger(s) or other touch input. Other touchscreen technologies may include, e.g., surface acoustic wave, surface capacitance, projected capacitance, mutual capacitance, and/or self-capacitance. Yet other analogous technologies may include, e.g., projected screens with optical imaging and/or computer-vision.

In some embodiments, the user interface subsystem 1124 may also include mechanical buttons, keyboards, switches, scroll wheels and/or other mechanical input devices. Mechanical user interfaces are usually used to open or close a mechanical switch, resulting in a differentiable electrical signal. While physical buttons may be more difficult to seal against the elements, they are nonetheless useful in low-power applications since they do not require an active electrical current draw. For example, many BLE applications may be triggered by a physical button press to further reduce GUI power requirements.

More generally, however, any scheme for detecting user input may be substituted with equal success for any of the foregoing tasks. While the foregoing techniques are described in the context of a touchscreen and physical buttons that enable user data entry, artisans of ordinary skill in the related arts will readily appreciate that any of their derivatives may be substituted with equal success.

Microphone/Speaker Implementation and Design Considerations

Audio input may incorporate a microphone and codec (discussed above) with a speaker. As previously noted, the microphone can capture and convert audio for voice commands. For audible feedback, the audio codec may obtain audio data and decode the data into an electrical signal. The electrical signal can be amplified and used to drive the speaker to generate acoustic waves.

As previously noted, the microphone and speaker may have any number of microphones and/or speakers for beamforming. For example, two speakers may be used to provide stereo sound. Multiple microphones may be used to collect both the user's vocal instructions as well as the environmental sounds.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) The data interfaces are configured to read/write data to a removeable non-transitory computer-readable medium (e.g., flash drive or similar memory media).

The illustrated network/data interface 1126 may include network interfaces including, but not limited to: Wi-Fi, Bluetooth, Global Positioning System (GPS), USB, and/or Ethernet network interfaces. Additionally, the network/data interface 1126 may include data interfaces such as: SD cards (and their derivatives) and/or any other optical/electrical/magnetic media (e.g., MMC cards, CDs, DVDs, tape, etc.)

Network Interface Implementation and Design Considerations

The communication subsystem including the network/data interface 1126 of the encoding device 1100 may include one or more radios and/or modems. As used herein, the term "modem" refers to a modulator-demodulator for converting computer data (digital) into a waveform (baseband analog). The term "radio" refers to the front-end portion of the modem that upconverts and/or downconverts the baseband analog waveform to/from the RF carrier frequency.

As previously noted, communication subsystem with network/data interface 1126 may include wireless subsystems (e.g., 5th/6th Generation (5G/6G) cellular networks, Wi-Fi, Bluetooth (including, Bluetooth Low Energy (BLE) communication networks), etc.) Furthermore, the techniques described throughout may be applied with equal success to wired networking devices. Examples of wired communications include without limitation Ethernet, USB, PCI-e. Additionally, some applications may operate within mixed environments and/or tasks. In such situations, the multiple different connections may be provided via multiple different communication protocols. Still other network connectivity solutions may be substituted with equal success.

More generally, any scheme for transmitting data over transitory media may be substituted with equal success for any of the foregoing tasks.

Data Interface Implementation and Design Considerations

The communication subsystem of the encoding device 1100 may include one or more data interfaces for removeable media. In one exemplary embodiment, the encoding device 1100 may read and write from a Secure Digital (SD) card or similar card memory.

While the foregoing discussion is presented in the context of SD cards, artisans of ordinary skill in the related arts will readily appreciate that other removeable media may be substituted with equal success (flash drives, MMC cards, etc.) Furthermore, the techniques described throughout may be applied with equal success to optical media (e.g., DVD, CD-ROM, etc.).

More generally, any scheme for storing data to non-transitory media may be substituted with equal success for any of the foregoing tasks.

Functional Overview of the Control and Data Processing Subsystem

Functionally, the control and data processing subsystems are used to read/write and store data to effectuate calculations and/or actuation of the sensor subsystem, user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 11, the control and data subsystem may include one or more of: a central processing unit (CPU 1106), an image signal processor (ISP 1102), a graphics processing unit (GPU 1104), a codec 1108, and a non-transitory computer-readable medium 1128 that stores program instructions and/or data. In some implementations, a neural network processing unit (NPU 1107) may additionally be included for machine-learning applications.

Processor-Memory Implementations and Design Considerations

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU (such as shown in FIG. 6) may be primarily used to control device operation and/or perform tasks of arbitrary complexity/best-effort. CPU operations may include, without limitation: general-purpose operating system (OS) functionality (power management, UX), memory management, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or auto exposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization. In many cases, the ISP may locally execute its own real-time operating system (RTOS) to schedule tasks of according to real-time constraints.

Much like the ISP, the GPU is primarily used to modify image data and may be heavily pipelined (seldom branches) and may incorporate specialized vector-matrix logic. Unlike the ISP however, the GPU often performs image processing acceleration for the CPU, thus the GPU may need to operate on multiple images at a time and/or other image processing tasks of arbitrary complexity. In many cases, GPU tasks may be parallelized and/or constrained by real-time budgets. GPU operations may include, without limitation: stabilization, lens corrections (stitching, warping, stretching), image corrections (shading, blending), noise reduction (filtering, etc.). GPUs may have much larger addressable space that can access both local cache memory and/or pages of system virtual memory. Additionally, a GPU may include multiple parallel cores and load balancing logic to e.g., manage power consumption and/or performance. In some cases, the GPU may locally execute its own operating system to schedule tasks according to its own scheduling constraints (pipelining, etc.).

The hardware codec converts image data to an encoded data for transfer and/or converts encoded data to image data for playback. Much like ISPs, hardware codecs are often designed according to specific use cases and heavily commoditized. Typical hardware codecs are heavily pipelined, may incorporate discrete cosine transform (DCT) logic (which is used by most compression standards), and often have large internal memories to hold multiple frames of video for motion estimation (spatial and/or temporal). As with ISPs, codecs are often bottlenecked by network connectivity and/or processor bandwidth, thus codecs are seldom parallelized and may have specialized data structures (e.g., registers that are a multiple of an image row width, etc.). In some cases, the codec may locally execute its own operating system to schedule tasks according to its own scheduling constraints (bandwidth, real-time frame rates, etc.).

Other processor subsystem implementations may multiply, combine, further sub-divide, augment, and/or subsume the foregoing functionalities within these or other processing elements. For example, multiple ISPs may be used to service multiple camera sensors. Similarly, codec functionality may be subsumed with either GPU or CPU operation via software emulation.

In one embodiment, the memory subsystem may be used to store data locally at the encoding device 1100. In one exemplary embodiment, data may be stored as non-transitory symbols (e.g., bits read from non-transitory computer-readable mediums.) In one specific implementation, the memory subsystem including non-transitory computer-readable medium 1128 is physically realized as one or more physical memory chips (e.g., NAND/NOR flash) that are logically separated into memory data structures. The memory subsystem may be bifurcated into program code 1130 and/or program data 1132. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

In some embodiments, the program code may be statically stored within the encoding device 1100 as firmware. In other embodiments, the program code may be dynamically stored (and changeable) via software updates. In some such variants, software may be subsequently updated by external parties and/or the user, based on various access permissions and procedures.

Neural Network and Machine Learning Implementations

Historically, machine-learning logic was often implemented as large vector-matrix operations which can be performed on specialized vector-matrix logic (such as might be found in the GPU). More recently, however, machine-learning logic may be implemented as a wholly separate logic specifically for accelerating neural network computations. Typically, the NPU includes hardware acceleration for highly parallelized matrix multiplication and non-linear processing (for activation functions).

Unlike traditional "Turing"-based processor architectures (discussed above), neural network processing emulates a network of connected nodes (also known as "neurons") that loosely model the neuro-biological functionality found in the human brain. While neural network computing is still in its infancy, such technologies already have great promise for e.g., compute rich, low power, and/or continuous processing applications.

Each processor node of the neural network is a computation unit that may have any number of weighted input connections, and any number of weighted output connections. The inputs are combined according to a transfer function to generate the outputs. In one specific embodiment, each processor node of the neural network combines its inputs with a set of coefficients (weights) that amplify or dampen the constituent components of its input data. The input-weight products are summed and then the sum is passed through a node's activation function, to determine the size and magnitude of the output data. "Activated" neurons (processor nodes) generate output data. The output data may be fed to another neuron (processor node) or result in an action on the environment. Coefficients may be iteratively updated with feedback to amplify inputs that are beneficial, while dampening the inputs that are not.

Many neural network processors emulate the individual neural network nodes as software threads, and large vector-matrix multiply accumulates. A "thread" is the smallest discrete unit of processor utilization that may be scheduled for a core to execute. A thread is characterized by: (i) a set of instructions that is executed by a processor, (ii) a program counter that identifies the current point of execution for the thread, (iii) a stack data structure that temporarily stores thread data, and (iv) registers for storing arguments of opcode execution. Other implementations may use hardware or dedicated logic to implement processor node logic.

As used herein, the term "emulate" and its linguistic derivatives refers to software processes that reproduce the function of an entity based on a processing description. For example, a processor node of a machine learning algorithm may be emulated with "state inputs", and a "transfer function", that generate an "action."

Unlike the Turing-based processor architectures, machine learning algorithms learn a task that is not explicitly described with instructions. In other words, machine learning algorithms seek to create inferences from patterns in data using e.g., statistical models and/or analysis. The inferences may then be used to formulate predicted outputs that can be compared to actual output to generate feedback. Each iteration of inference and feedback is used to improve the underlying statistical models. Since the task is accomplished through dynamic coefficient weighting rather than explicit instructions, machine learning algorithms can change their behavior over time to e.g., improve performance, change tasks, etc.

Typically, machine learning algorithms are "trained" until their predicted outputs match the desired output (to within a threshold similarity). Training may occur "offline" with batches of prepared data or "online" with live data using system pre-processing. Many implementations combine offline and online training to e.g., provide accurate initial performance that adjusts to system-specific considerations over time. Once the NPU has "learned" appropriate behavior, the NPU may be used in real-world scenarios. NPU-based solutions are often more resilient to variations in environment and may behave reasonably even in unexpected circumstances (e.g., similar to a human.)

Generalized Processor-Based Proxy Data

Exemplary embodiments of the present disclosure use metadata from previous processing stages to create processor-based proxy data for the control and data subsystem in real-time (or near real-time). For example, the encoder can use information from previous frames to predict encoding complexity. More generally however, the encoder is just one processing element in a pipeline of processing elements. Each pipeline stage processes the data in sequence, and many issues that might affect encoding are also likely to affect upstream processing as well. Thus, the concepts may be broadly extended to any information from previous processing stages that might be used as a proxy for encoding complexity.

Conceptually, encoding quality is affected by a variety of factors. Examples may include, without limitation, data amount, bitwidth, granularity, temporal variance, ambiguity/redundancy, noise, resource constraints, compression, etc. Many of these factors also affect and/or may be introduced by previous pipeline stages. For example, some pipeline stages may reduce the amount of data being processed due to e.g., bandwidth or resource limitations. In some such variants, this information might be used to predict the resulting encoding bitrate e.g., a bandwidth limitation might also directly cause an encoding bitrate reduction downstream, etc. Similarly, some stages may increase the amount of data e.g., to improve the robustness and resilience of downstream encoding. Common examples might include e.g., line coding, forward error correction, etc. In such variants, this information might be roughly analogous to the image content itself e.g., image data that has relatively minimal error correction is also likely to be low complexity and vice versa. More generally, any processing metadata that could be used to forecast the resulting encoding quality could be used as processor-based proxy data.

While the foregoing discussion is presented in the context of an in-device image processing pipeline with a specific set of stages (e.g., an image signal processing stage, a stabilization and denoising stage, and an encoding stage) the concepts may be broadly applied to a variety of other processing pipelines. For example, some devices may incorporate communication stages (e.g., transmit/receive, encryption/decryption, etc.) for transmission over signaling media. Other devices may incorporate machine-learning, graphics processing, and/or other media manipulation stages. Yet other devices may include data analysis, filtering, and/or other monitoring stages.

Notably, processing pipelines are commonly used in a variety of server-side and client-side applications. For example, the processing pipeline may enable traffic moderation at the server-side; other examples may allow for error-recovery at the client-side. A variety of user applications may also use pipeline processing to schedule processing loads for resource limitations of a platform.

As a related matter, certain embodiments of the present disclosure use metadata from concurrent processing stages to create processor-based proxy data for the control and data subsystem in real-time (or near real-time). For example, the encoder can use information from the corresponding frame of a different encoder (e.g., LRV) to predict encoding complexity of the current frame (e.g., MRV). In other words, the encoder may also be one task of a number of concurrent tasks. In some cases, concurrent tasks may affect and/or otherwise forecast the current encoding quality. Thus, the concepts may be broadly extended to any information from concurrent tasks that might be used as a proxy for encoding complexity.

As a practical matter, the foregoing discussion has been framed in the context of a real-time operating system (RTOS) that schedules tasks for completion within definitive constraints. More generally however, the concepts may be broadly extended to high-level operating systems (OSes) which are typically best-effort. As a brief aside, many high-level OSes must dynamically manage varying task loads; in some cases, this may affect encoding quality. For example, a laptop running a low priority variable rate encoder may also have other applications running in the background. Under some conditions, the laptop may consider background memory usage as a proxy for encoded image quality since the encoding quality may be strongly affected by available memory resources. Other examples of processor-based proxy data may include e.g., task load, memory load, memory availability, network bandwidth, power consumption, interrupt frequency, etc. More generally, processor-based proxy data may be broadly extended to any processing resource that might affect the encoded quality.

Generalized Dynamic Encoder Configuration Based on Proxy Data

While the foregoing discussion is presented in the context of an in-device image processing pipeline with a specific set of stages (e.g., an image signal processing stage, a stabilization and denoising stage, and an encoding stage) the concepts may be broadly applied to a variety of other processing pipelines, the techniques may be broadly extended to any media processing pipeline. As used herein, the term "pipeline" refers to a set of processing elements that process data in sequence, such that each processing element may also operate in parallel with the other processing elements. For example, a 3-stage pipeline may have first, second, and third processing elements that operate in parallel. During operation, the input of a second processing element includes at least the output of a first processing element, and the output of the second processing element is at least one input to a third processing element. While the foregoing discussion is presented in the context of a pipeline with physical processing elements, artisans of ordinary skill in the related arts will readily appreciate that virtualized and/or software-based pipelines may be substituted with equal success.

In one embodiment, the non-transitory computer-readable medium includes a routine that enables dynamic encoder configuration. When executed by the control and data subsystem, the routine causes the encoding device to: obtain a model identifies an optimization target from proxy data; obtain proxy data; and adjust encoding based on the proxy data. Under certain conditions, the routine may further switch between modalities of dynamic codec configuration.

Instruction 1142 causes the encoding device to obtain a model that identifies an optimization target from proxy data. In one exemplary embodiment, the model comprises a machine-learning model that has been trained to classify images according to their complexity using proxy data. In one specific variant, the proxy data comprises sensor-based proxy data (e.g., pixel features) and processor-based proxy data (e.g., encoding features). Here, the classification is based on the peak signal-to-noise ratio (PSNR) of YUV image data, for a set of frames (e.g., a GOP of 1 second in length). The complexity classification is used to identify the bitrate that corresponds to the optimization target; for example, the pixel features and encoding features correspond to a predicted PSNR—the predicted PSNR is then used to select a corresponding bitrate. Here, the predicted PSNR is "learned" from a library of training videos. For example, the machine learning logic may have been previously trained against a set of training video segments, with actual PSNR of the encoded videos compared to the reference videos.

In one embodiment, the machine-learning model may be based on "random forest", gradient boosted trees, and/or any other machine-learning logic configured to classify input data according to labels. Examples of such machine logic include logistic regression, decision trees, random forests, support vector machine (SVM), k-nearest neighbors (KNN), and neural networks. Classification could be binary (complex, not complex), or multi-class (high motion high texture, high motion low texture, low motion low texture, low motion high texture, etc.). Still other classification techniques might label according to image PSNR (e.g., 5 dB, 10 dB, 15 dB, etc.), or other optimization target.

While the foregoing discussion is presented with reference to a machine-learning model, other forms of logic may be substituted with equal success. For example, a look-up-table (LUT) could be used for very simple relationships between proxy data and the optimization target. More complex relationships may be described with single or multi-variant equations. Still other logic may incorporate conditional rules, triggers, and/or other heuristic-based logic.

The foregoing examples are described in the context of a machine-learning model that is trained offline and then stored or otherwise programmed to the device for online operation, virtually any other technique for obtaining or providing the model may be substituted with equal success. In some cases, the models may be downloaded in an untrained format, and then trained on live data during use. For example, multiple encoders operating in parallel could be used to provide both the encoded image and the reference image. Other implementations may be downloaded via software update, firmware update, or similar programming.

Instruction 1144 causes the encoding device to obtain proxy data. In one embodiment, the proxy data is generated according to real-time (or near real-time) constraints of the encoding device; for example, an embedded device may have a fixed buffer size that limits the amount of data that can be captured (e.g., a camera may only have a 1 second memory buffer for image data). In other cases, the encoding device may have a real-time operating system that imposes scheduling constraints in view of its tasks.

In one embodiment, the proxy data may include real-time (or near real-time) information generated by a sensor. Examples of such information may include light information, acoustic information, and/or inertial measurement data. In other embodiments, the real-time (or near real-time) proxy data may be determined from onboard processing. For example, an image stabilization algorithm may generate motion vectors based on sensed inertial measurements. In other embodiments, an auto exposure, white balance, and color correction algorithms may be based on captured image data.

While the foregoing discussion is presented in the context of a "previous stage" of the pipeline, artisans of ordinary skill in the related arts will readily appreciate that some embodiments may obtain proxy data information from a subsequent stage of the pipeline. For example, live streaming embodiments may encode video for transmission over a network; in some situations, the modem might provide network capacity information that identifies a bottleneck in data transfer capabilities (and by extension encoding complexity). As another example, computer vision applications (e.g., self-driving cars) may adjust encoding according to the application requirements, e.g., a neural network processor may provide proxy data based on object recognition from the image data, etc. As yet another example, a CPU might provide information from the OS on behalf of a user input received from the user interface.

More broadly, the proxy data may include any real-time (or near real-time) information captured or generated by any subsystem of the encoding device. While the foregoing discussion has been presented in the context of ISP image correction data and codec encoding data, artisans of ordinary skill in the related arts will readily appreciate that other proxy data may come from the CPU, modem, neural network processors, and/or any other entity of the device.

In some embodiments, the proxy data may be included as part of the metadata that accompanies the image data. In other embodiments, the proxy data may be provided out-of-band via dedicated memory buffers and/or signalling. For example, the image processing pipeline (discussed above in FIG. 1), includes two DDR memory buffers which may store image data and any corresponding proxy data. While the foregoing discussion is presented in the context of FIFO (first-in-first-out) circular buffers, a variety of other memory organizations may be substituted with equal success. Examples may include e.g., last-in-first-out (LIFO), ping-pong buffers, stack (thread-specific), heap (thread-agnostic), and/or other memory organizations commonly used in the computing arts. More generally, however, any scheme for obtaining, providing, or otherwise transferring data between stages of the pipeline may be substituted with equal success. Examples may include shared mailboxes, packet-based delivery, bus signaling, interrupt-based signaling, and/or any other mode of communication.

As previously noted, real-time (and near real-time) processing is often subject to time-related constraints. In some embodiments, proxy data may include explicit timestamping or other messaging that directly associates it with corresponding images and/or frames of video. This may be particularly useful for proxy data of arbitrary or unknown timing (e.g., user input or neural network classifications provided via a stack or heap type data structure, etc.).

Instruction 1146 causes the encoding device to adjust a control parameter based on the proxy data. In one exemplary embodiment, the encoding device uses a trained machine-learning model that classifies an image complexity based on its pixel features and encoding features; the labeled image complexity is used to select a bitrate that corresponds to an expected image quality. In some embodiments, the resulting encoded image may be compared to a reference image to calculate an actual image quality to improve the machine-learning model; in other implementations, the resulting encoded image may not have a reference image to compare against. Here, the term "expected" refers to the outcome that is predicted based on the model, whereas "actual" refers to the outcome that is verified by a process external to the model. More generally, the various principles described herein leverage the representative nature of the proxy data to expected image quality to inform dynamic codec configuration, without requiring subsequent verification of the actual image quality.

While the disclosed examples use peak signal-to-noise ratio (PSNR) of pixel values for image quality, other metrics may be substituted for image quality. Examples might include subjective metrics, agreed-upon image libraries, user-specified models, and/or other metrics. Similarly, while the foregoing examples use bitrate selection as the configurable control parameter, other control parameters might be substituted with equal success. Examples might include minimum quantization parameter (QP), resolution, frame rate, bit depth, and/or other codec parameter(s) might be substituted with equal success.

The exemplary embodiments are optimized for image quality, other optimization targets might include e.g., local storage space, power consumption, network storage space, transmission size, and/or other resource. Different optimization targets may use different control parameters; generally, control parameters may affect e.g., complexity, latency, throughput, bit rate, media quality, data format, resolution, size, and/or any number of other media characteristics. More generally, any parameter that modifies the manner in which the encoding is performed and/or the output of the encoding process may be substituted with equal success.

In one embodiment, the control parameters may be generated in advance and retrieved from a look-up-table or similar reference data structure. In other embodiments, the control parameters may be calculated according to heuristics or algorithms. In still other embodiments, the control parameters may be selected from a history of acceptable parameters for similar conditions. Still other embodiments may use e.g., machine learning algorithms or artificial intelligence logic to select suitable configurations. In some embodiments, external entities (e.g., a network or decoding device) may provide additional guidance, a selection of acceptable parameters that the encoding device may select from, or even the control parameters themselves. More generally, however, any scheme for adjusting a control parameter based on proxy data from previous stages of a pipeline and/or other concurrent processing may be substituted with equal success.

Instruction 1148 causes the encoding device to switch between modalities of dynamic codec configuration. In one exemplary embodiment, the model may have a first range of operation and one or more boundary ranges. In one specific implementation, the machine-learning model may have an iso-quality region, a floor region, and a ceiling region. Here, the "floor" and "ceiling" regions correspond to regions where the control parameter (bitrate) is outside the adjustment range of the optimization target (image quality). More generally, the various techniques described herein may be broadly extended to any dynamic encoding system with multiple modalities, where each modality encapsulates a specific set of conditions, behaviors, or characteristics of the encoding process.

In one embodiment, different modalities are characterized by different behaviors for the control parameter and/or optimization target. For example, an encoding device may adjust its image quality target based on bitrates in the floor or ceiling region. As another example, an encoding device might adjust its encoding configuration (e.g., resolution, frame rate, etc.) to accommodate bitrates below the floor or above the ceiling region.

In other embodiments, different modalities may be characterized by adjusting behaviors of the previous stages or subsequent stages. For example, an encoding device may adjust its image signal processing front end based on bitrates in the floor or ceiling region. As another example, an encoding device might adjust its network configuration (e.g., resolution, frame rate, etc.) and/or dynamic memory allocations to accommodate bitrates below the floor or above the ceiling region.

In some embodiments, shifts between modalities may be require changes to the processing pipeline which invalidate previously processed data. As previously noted, pipelining breaks data processing into stages; data propagates through the pipeline in lockstep. If an error or an exceptional condition occurs, the pipeline might need to be flushed to maintain the consistent data flow handling. Pipeline flushes greatly impact the latency and throughput of a pipeline, and should be sparingly used. Thus, some implementations may additionally incorporate hysteresis and/or differential information before switching between modalities.

In some variants, an encoding device might consider the time averaged behavior to avoid resist sudden changes (avoiding "churn"). In other variants, an encoding device might pre-emptively prepare for upcoming changes by e.g., adjusting encoder configuration in advance. In some cases, pre-emptive adjustments may additionally be propagated to downstream processing e.g., a change to encoder modality to accommodate an increase/decrease in anticipated bitrates may be propagated to downstream memory allocations and/or processing, etc.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant, or implementation. The appearances of such phrases in various places in the specification are not necessarily all referring to the same embodiment, variant, or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for dynamically configuring an encoder in a pipeline, comprising:

capturing light data via photoelectric sensors;

mapping the light data to a first set of images and a second set of images via an image signal processor in a first stage of the pipeline;

obtaining a model relating proxy data to image complexity;

obtaining a first proxy data for the first set of images during the first stage of the pipeline;

determining a first encoding parameter for a consistent optimization target based on the first proxy data and the model;

configuring the encoder to encode a first video segment based on the first encoding parameter;

obtaining a second proxy data for the second set of images during a second stage of the pipeline;

determining a second encoding parameter for the consistent optimization target based on the second proxy data and the model;

configuring the encoder to encode a second video segment based on the second encoding parameter; and where the first video segment and the second video segment are within a threshold tolerance of the consistent optimization target.

2. The method of claim 1, where the proxy data comprises pixel features from a previous stage of the pipeline, and where configuring the encoder occurs in a current stage of the pipeline.

3. The method of claim 1, where the proxy data comprises encoding features from a previous video segment.

4. The method of claim 1, where the model comprises a machine-learning model configured to predict an image quality of an encoded video segment of a reference video segment based on pixel features of the reference video segment.

5. The method of claim 1, where the model comprises a machine-learning model configured to predict an image quality of an encoded video segment of a reference video segment based on encoding features of a previous reference video segment.

6. The method of claim 1, where the model comprises a machine-learning model configured to predict an image quality of an encoded video segment of a reference video segment based on encoding features of a lower resolution reference video segment.

7. The method of claim 1, where the first encoding parameter is a first bitrate, the second encoding parameter is a second bitrate, and the consistent optimization target is peak signal-to-noise ratio.

8. A device, comprising:

a camera configured to capture at least a first image;

an image processing pipeline comprising an encoder;

a machine-learning logic trained to select a bitrate based on proxy data comprising encoding features calculated by the encoder corresponding to a previous encode of at least a previous image different than the first image;

a processor; and a non-transitory computer-readable medium comprising a set of instructions that, when executed by the processor, causes the processor to:

provide a first proxy data associated with at least the first image to the machine-learning logic;

obtain a first bitrate from the machine-learning logic based on the first proxy data; and configure the encoder to encode at least the first image based on the first bitrate.

9. The device of claim 8, where the image processing pipeline further comprises an image signal processor and the first proxy data comprises pixel features calculated from at least the first image by the image signal processor.

10. The device of claim 8, where the proxy data further comprises an other encoding features calculated by an other encoder corresponding to a low resolution encode of at least the first image.

11. The device of claim 8, where the set of instructions, when executed by the processor, further causes the processor to:

cause the camera to capture at least a second image and at least the first image according to a real-time frame rate;

provide a second proxy data associated with the second image to the machine-learning logic;

obtain a second bitrate from the machine-learning logic based on the second proxy data; and configure the encoder to encode at least the second image based on the second bitrate according to the real-time frame rate.

12. The device of claim 11, where the first bitrate equals the second bitrate.

13. The device of claim 11, where the first bitrate and the second bitrate are different.

14. An encoding device, comprising:

an encoder configured to encode according to a first modality and a second modality;

a machine-learning logic trained according to select bitrates according to the first modality and the second modality;

a processor; and a non-transitory computer-readable medium comprising a set of instructions that, when executed by the processor, causes the processor to:

provide a first proxy data associated with a first image to the machine-learning logic according to the first modality;

obtain a first bitrate from the machine-learning logic based on the first proxy data; and switch to the second modality based on the first bitrate exceeding a ceiling threshold or falling below a floor threshold.

15. The device of claim 14, where the encoder encodes the first image according to the first modality based on the first bitrate.

16. The device of claim 14, where the first modality is based on a first image quality and the second modality is based on a second image quality.

17. The device of claim 14, where the first modality is based on a first image resolution and the second modality is based on a second image resolution.

18. The device of claim 14, where the first modality is based on a first video frame rate and the second modality is based on a second video frame rate.

19. The device of claim 14, where the first modality is based on a first video encoding standard and the second modality is based on a second video encoding standard.

* * * * *